US012352386B2

(12) United States Patent
Armstrong et al.

(10) Patent No.: US 12,352,386 B2
(45) Date of Patent: Jul. 8, 2025

(54) CHOCKING COMPOUND DAM DEVICE AND KIT AND ADDITIVE MANUFACTURING THEREOF

(71) Applicant: The Government of the United States of America, as represented by the Secretary of Homeland Security, Washington, DC (US)

(72) Inventors: Andrew P. Armstrong, New Orleans, LA (US); Guy P. Tharpe, Gloucester, VA (US)

(73) Assignee: The Government of the United States of America, represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 18/595,556

(22) Filed: Mar. 5, 2024

(65) Prior Publication Data
US 2024/0301987 A1    Sep. 12, 2024

Related U.S. Application Data

(60) Provisional application No. 63/450,724, filed on Mar. 8, 2023.

(51) Int. Cl.
*F16M 5/00*    (2006.01)
(52) U.S. Cl.
CPC ..................................... *F16M 5/00* (2013.01)
(58) Field of Classification Search
CPC ......................................................... F16M 5/00
USPC ........................................................ 248/679
See application file for complete search history.

(56) References Cited

U.S. PATENT DOCUMENTS

| | | | | |
|---|---|---|---|---|
| 1,754,638 A | * | 4/1930 | Mead ...................... | E04G 17/12 249/47 |
| 3,788,591 A | * | 1/1974 | Arps ........................ | B44B 1/00 249/157 |
| 5,390,459 A | * | 2/1995 | Mensen ................ | E04B 2/8617 52/424 |
| 6,164,615 A | * | 12/2000 | Basham .................. | B28B 19/00 248/637 |
| 6,568,651 B2 | * | 5/2003 | Reid ...................... | E04G 17/047 403/294 |
| 7,290,749 B1 | * | 11/2007 | Jessop ..................... | E04G 13/00 249/34 |
| 7,331,560 B2 | * | 2/2008 | Jessop ................... | E04G 17/001 249/34 |

(Continued)

FOREIGN PATENT DOCUMENTS

CN    220058554    * 11/2023

*Primary Examiner* — Eret C McNichols
(74) *Attorney, Agent, or Firm* — Lavanya Besch; Robert W. Busby; Kelly G. Hyndman

(57) ABSTRACT

In an example, a chocking compound dam includes a plurality of prefabricated dam walls. Each prefabricated dam wall has two side edges each being configured to connect to a side edge of another prefabricated dam wall. The plurality of prefabricated dam walls are connected to form a dam surrounding a chocking compound pour area. Each prefabricated dam wall has a height and a length. At least one of the prefabricated dam walls includes a longitudinal stiffener. The longitudinal stiffener extends along the length of the prefabricated dam wall and has a width protruding transversely from the prefabricated dam wall.

29 Claims, 29 Drawing Sheets

(56) References Cited

U.S. PATENT DOCUMENTS

| | | | |
|---|---|---|---|
| 8,407,954 B2* | 4/2013 | Keith | E04B 2/44 52/831 |
| 9,115,491 B2* | 8/2015 | Keith | E04B 2/8652 |
| 11,125,114 B2* | 9/2021 | Menchicchi | F16M 5/00 |
| 2004/0144057 A1* | 7/2004 | Meek | E04C 3/07 52/656.2 |
| 2004/0255535 A1* | 12/2004 | Herren | E04B 1/08 52/348 |

* cited by examiner to# CHOCKING COMPOUND DAM DEVICE AND KIT AND ADDITIVE MANUFACTURING THEREOF

CROSS-REFERENCE TO RELATED APPLICATIONS

The application claims the benefit of priority from U.S. Provisional Patent Application No. 63/450,724, filed Mar. 8, 2023, entitled CHOCKING COMPOUND DAM DEVICE AND KIT AND ADDITIVE MANUFACTURING THEREOF, the disclosure of which is incorporated by reference in its entirety.

SUMMARY STATEMENT OF GOVERNMENT INTEREST

The present invention was made with support from the United States Department of Homeland Security (DHS) and by employees of DHS in the performance of their official duties. The U.S. Government has certain rights in this invention.

FIELD

The discussion below relates generally to forming chocks and, more particularly, to apparatus and methods of making and using chocking compound dam devices for forming chocks.

BACKGROUND

Currently engine change outs require the servicing technician to handmake a series of dams under each engine foot in which to pour the chocking compound (colloquially referred to as Chockfast). Chockfast is a two-part inert chocking or grouting compound for use under machinery, it is poured as a liquid and then exothermically cures filling the created dam/void and providing a strong foundation for machinery. Legacy dams were made of wood, sheet metal, metal flashing, metal tape, and/or putty, and had to be built up by hand to withstand the Chockfast material being poured in and watertight to prevent spillage. The legacy process took on average a full day to complete and had a high failure rate of 40%-50%. Any failures would add an additional 1-2 days due to having to let the compound cure then break it off and restart the process, plus it increased costs including the technicians time, travel costs, and the chocking material itself. The failure rate is so expected that standard practice is to procure 150% of the anticipated chocking amount required.

SUMMARY

Embodiments of the present invention are directed to apparatus and methods of making and using chocking compound dam devices for forming chocks.

There is a long-felt and unmet need to streamline engine and machinery replacements onboard cutters involving, more specifically, the way the machinery foot chocking foundation is installed.

The research has led to a custom tool that can be quickly modified electronically and then created through additive manufacturing. It was specifically designed to be 3D printed and take advantage of the Fused Filament Fabrication printing process. The tool helps with engine renewals on ships, where the engine mates with the mounts.

The new dam is designed to be installed in about 1 hour, easily modified, and fabricated through additive manufacturing processes. The dam may be made out of any polymer that maintains rigidity at 230 degrees Fahrenheit and can be produced through additive manufacturing. The design was sent to CG engineering to be modeled and then printed. The new dam was tested for fit, form, and function and revised for optimization. The final product was tested in the field with the following results: total time to install was about 2 hours (expected to be reduced with learning curves), all dams held, and they produced a superior product with cleaner lines and a more uniform base. In addition, some of the dam parts are able to be re-used, which was not feasible with the old methods. Overall, the dams are forecasted to reduce project times by at least a day and reduce re-work and overhead costs. The dams are easily re-sizeable and printed for other engine or equipment renewals wherever a chocking compound is required. To that end, each dam is a dam assembly including components that are modular in construction in specific embodiments. In addition, some embodiments provide a kit of components which a user can assemble to form different dam configurations for different applications having different structural or geometric requirements.

In accordance with an aspect, a chocking compound dam includes a plurality of prefabricated dam walls. Each dam wall has two side edges each being configured to connect to a side edge of another prefabricated dam wall. The plurality of prefabricated dam walls are connected to form a dam surrounding a chocking compound pour area. Each prefabricated dam wall has a height and a length. At least one of the prefabricated dam walls includes a longitudinal stiffener. The longitudinal stiffener extends along the length of the prefabricated dam wall and has a width protruding transversely from the prefabricated dam wall.

In accordance with another aspect, a kit for a chocking compound dam includes a plurality of prefabricated dam walls and a prefabricated pour spout clip. Each dam wall has two side edges each being configured to connect to a side edge of another prefabricated dam wall. The plurality of prefabricated dam walls are connected to form a dam surrounding a chocking compound pour area. Each prefabricated dam wall has a height and a length. At least one of the prefabricated dam walls includes a longitudinal stiffener. The longitudinal stiffener extends along the length of the prefabricated dam wall and has a width protruding transversely from the prefabricated dam wall. The prefabricated pour spout clip has a lower clip portion connected to an upper pour portion. The lower clip portion is configured to be clipped to an upper edge of a prefabricated dam wall of the prefabricated dam walls.

In accordance with yet another aspect, a method of forming a chock comprises constructing a chocking compound dam by connecting a plurality of prefabricated dam walls to form a dam surrounding a chocking compound pour area. Each prefabricated dam wall has two side edges each being configured to connect to a side edge of another prefabricated dam wall. Each prefabricated dam wall has a height and a length. At least one of the prefabricated dam walls includes a longitudinal stiffener, which extends along the length of the prefabricated dam wall and having a width protruding transversely from the prefabricated dam wall.

In some embodiments, one of the prefabricated dam walls includes a pour point for the chocking compound dam. The method further comprises pouring a chocking compound into the chocking compound pour area via a pour spout clip which is clipped to the prefabricated dam wall including the pour point at the pour point, and removing the chocking compound dam after curing of the chocking compound to form the chock.

In specific embodiments, the method further comprises creating a design of the plurality of prefabricated dam walls for forming a modular construction of the dam to surround the chocking compound pour area, and forming the plurality of prefabricated dam walls by additive manufacturing. The method may further comprise electronically modifying the design of the plurality of prefabricated dam walls to adapt to a change in the chocking compound pour area, and forming the plurality of prefabricated dam walls having the modified design by additive manufacturing.

Other features and aspects of various examples and embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The attached drawings help explain the embodiments described below.

DETAILED DESCRIPTION

A number of examples or embodiments of the present invention are described, and it should be appreciated that the present invention provides many applicable inventive concepts that can be embodied in a variety of ways. The embodiments discussed herein are merely illustrative of ways to make and use the invention and are not intended to limit the scope of the invention. Rather, as will be appreciated by one of skill in the art, the teachings and disclosures herein can be combined or rearranged with other portions of this disclosure along with the knowledge of one of ordinary skill in the art.

In accordance with embodiments, a custom chocking compound dam is designed to be quickly modified electronically and then created through additive manufacturing. The custom dam can be installed much more quickly than a conventional dam. Each dam may be a dam assembly including components that are modular in construction. Moreover, some embodiments provide a kit of components which a user can assemble to form different dam configurations for different applications having different structural or geometric requirements.

The varying number of pieces and connections within the chocking compound dam kit are ideal for different applications where a base (chock) is required to be formed for the installation of machinery or equipment. The interlocking damming walls or pieces are used with both male and female connections, allowing the user to fit around simple or complex geometries or to accommodate for potentially unknown lengths that are needed. The pieces can be modified to be male-female, male-male, or female-female on opposite side edges for making male-female connections between neighboring pieces. In addition, the geometry of the interlocking pieces is highly variable. Interlocking pieces can be made straight, 90 degree corner, custom degree corner (30-150 degrees), H shaped, U shaped or T shaped to allow multiple connections. The design is modular and would allow for non-standard shapes to be easily enclosed without the need to redesign the shape from scratch.

In accordance with an aspect, a chocking compound dam includes a plurality of prefabricated dam walls. Each dam wall has two side edges each being configured to connect to a side edge of another prefabricated dam wall. The plurality of prefabricated dam walls are connected to form a dam surrounding a chocking compound pour area. Each prefabricated dam wall has a height and a length. At least one of the prefabricated dam walls includes a longitudinal stiffener. The longitudinal stiffener extends along the length of the prefabricated dam wall and has a width protruding transversely from the prefabricated dam wall.

Figure 1:
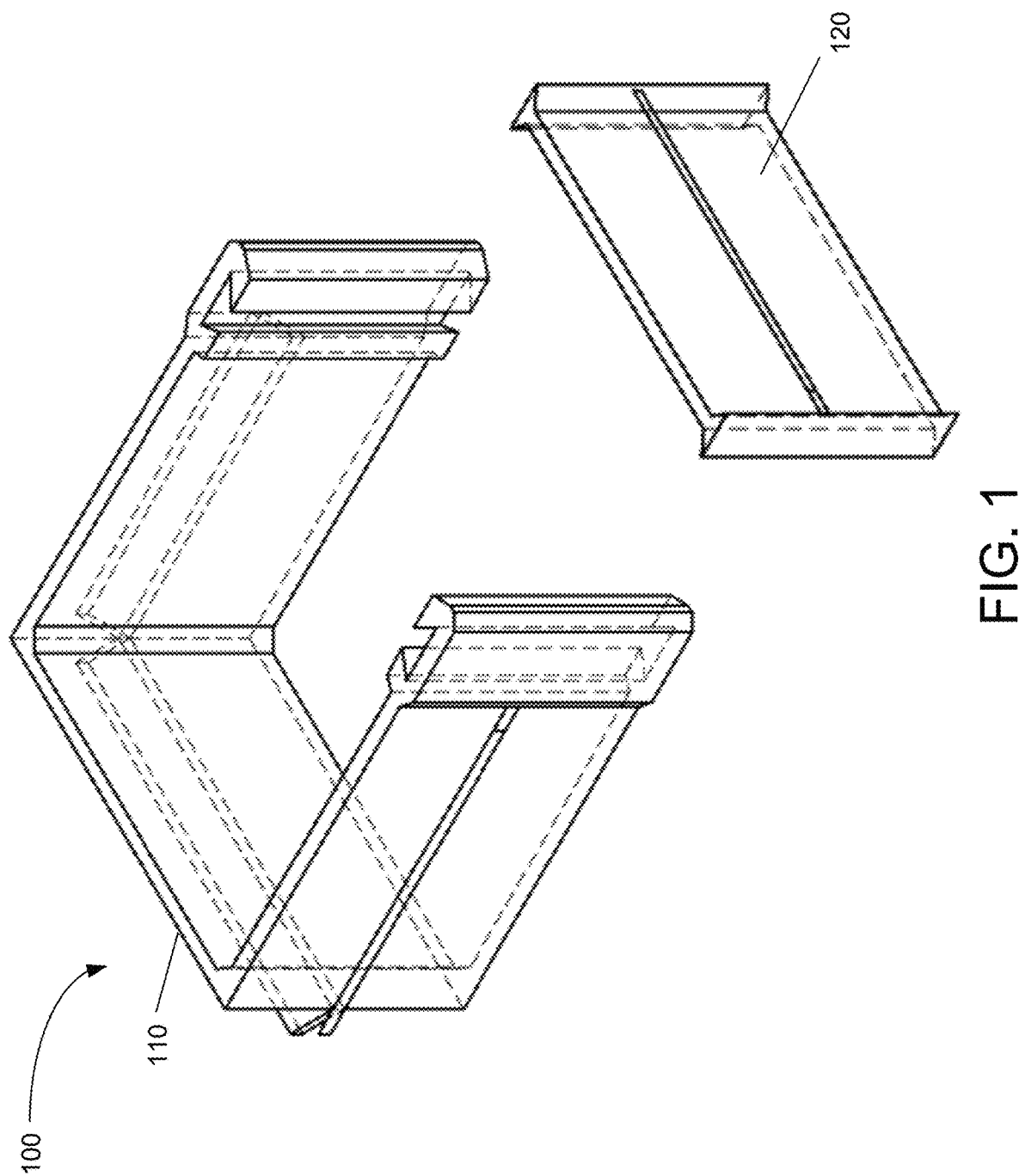
FIG. 1 is a perspective view illustrating an example of a front-foot chocking compound dam assembly having a U-shaped rear-and-side dam wall and a front dam wall.

FIG. 1 is a perspective view illustrating an example of a front-foot chocking compound dam assembly 100 having a U-shaped rear-and-side dam wall 110 and a front dam wall 120. The U-shaped dam wall 110 form three sides of the dam. The front dam wall 120 is connected to the U-shaped dam wall 110 to complete the construction of the dam on the fourth side of the dam 100. The dam walls 110, 120 form a rectangular dam surrounding a rectangular chocking compound pour area.

Figure 2:
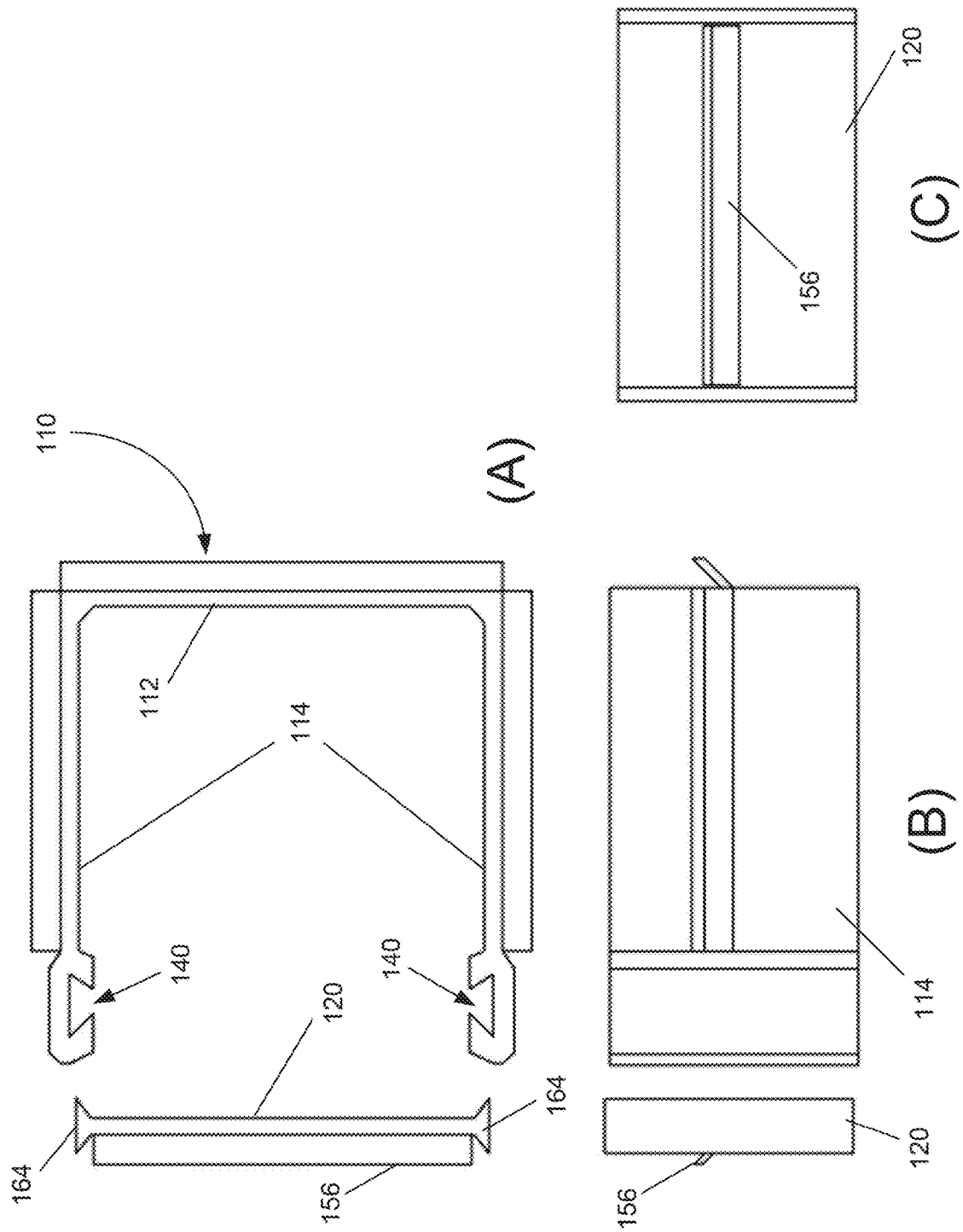
FIG. 2 shows (A) a top plan view, (B) a side elevational view, and (C) a front elevational view of the front-foot chocking compound dam assembly of FIG. 1.
Figure 3:
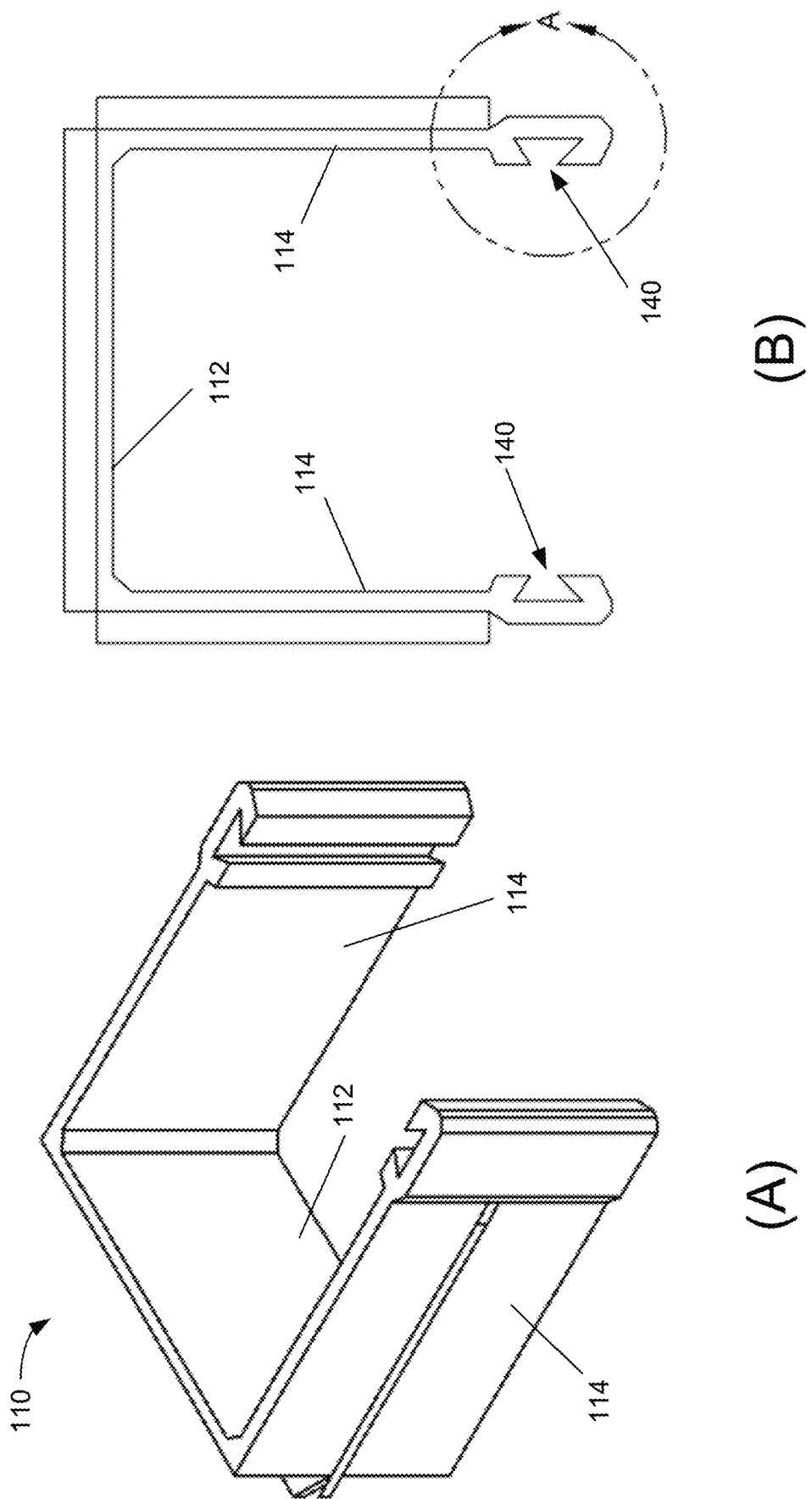
FIG. 3 shows (A) a perspective view and (B) a top plan view of the U-shaped rear-and-side dam wall of FIG. 1.

FIG. 2 shows (A) a top plan view, (B) a side elevational view, and (C) a front elevational view of the front-foot chocking compound dam assembly 100 of FIG. 1. FIG. 3 shows (A) a perspective view and (B) a top plan view of the U-shaped rear-and-side dam wall 110 of FIG. 1.

The U-shaped dam wall 110 includes a rear dam wall or piece or portion 112 and two side dam walls or pieces or portions 114. The rear dam wall 112 is a transverse member having a width between the two side dam walls 114. The side dam walls 114 are longitudinal members having the same length. The front dam wall 120 (transverse member) may have a front stiffener 156. In this example, the dam 100 is rectangular and the dam walls 112, 114, 120 have the same height. In other examples, the dam may have a different shape and the dam walls may have different or variable heights. The free ends of the side dam walls 114 each have a dovetail joint cavity 140 on an interior surface thereof. The two dovetail joint cavities 140 face one another across the width of the dam 100. The front dam wall 120 may include dovetail ends 164 at opposite sides for engaging the dovetail joint cavities 140 to form a sliding connection as a locking mechanism by sliding them in the height direction.

Figure 4:
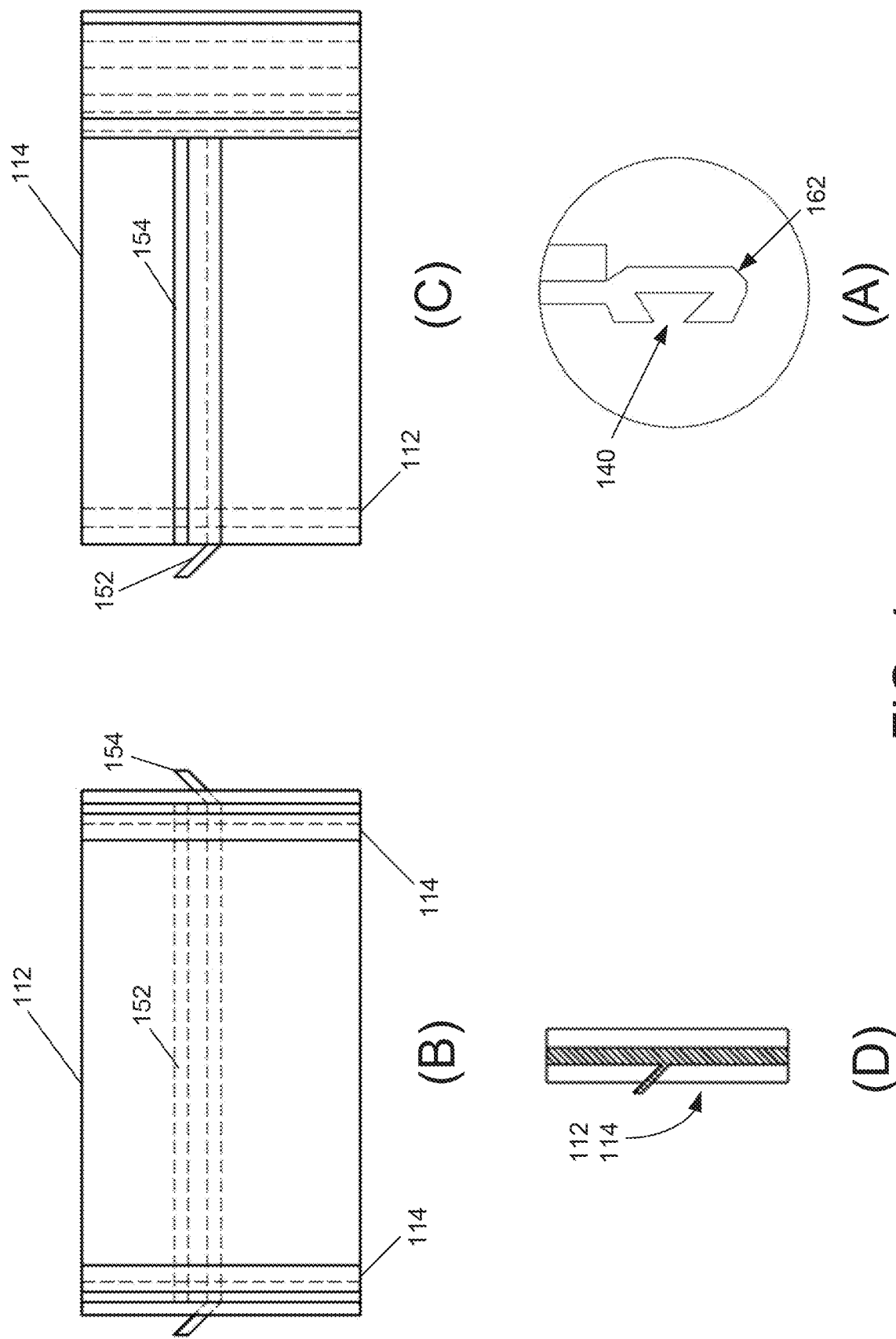
FIG. 4 shows (A) a closeup view of a dovetail joint cavity, and (B) a rear elevational view, (C) a side elevational view, and (D) a cross-sectional view of the U-shaped rear-and-side dam wall of the dam assembly of FIG. 1.

FIG. 4 shows (A) a closeup view of a dovetail joint cavity 140, (B) a rear elevational view, (C) a side elevational view, and (D) a cross-sectional view of the U-shaped rear-and-side dam wall (112, 114) of the dam assembly 100 of FIG. 1. The rear dam wall 112 (transverse member) may have a rear stiffener 152. The side dam wall 114 (longitudinal member) may include a side stiffener 154. The dovetail joint cavity 140 has a 45° dovetail configuration in the example shown. The stiffeners 152, 154, 156 may protrude transversely from the external surfaces of the dam walls at an angle less than 90° (e.g., between about 30° and about 60° or an angle of about 45°). The stiffener extends in a length direction of the dam wall, and adds longitudinal structural stiffness and prevents the dam wall from buckling or bowing or otherwise deforming, thereby preserving the structural integrity of the dam wall. The dovetail joint cavity 140 may have chamfered outside edges 162. The front dam wall 120 (FIG. 2) may include dovetail ends at opposite sides for engaging the dovetail joint cavities 140 to form a sliding connection as a locking mechanism by sliding them in the height direction.

Figure 5:
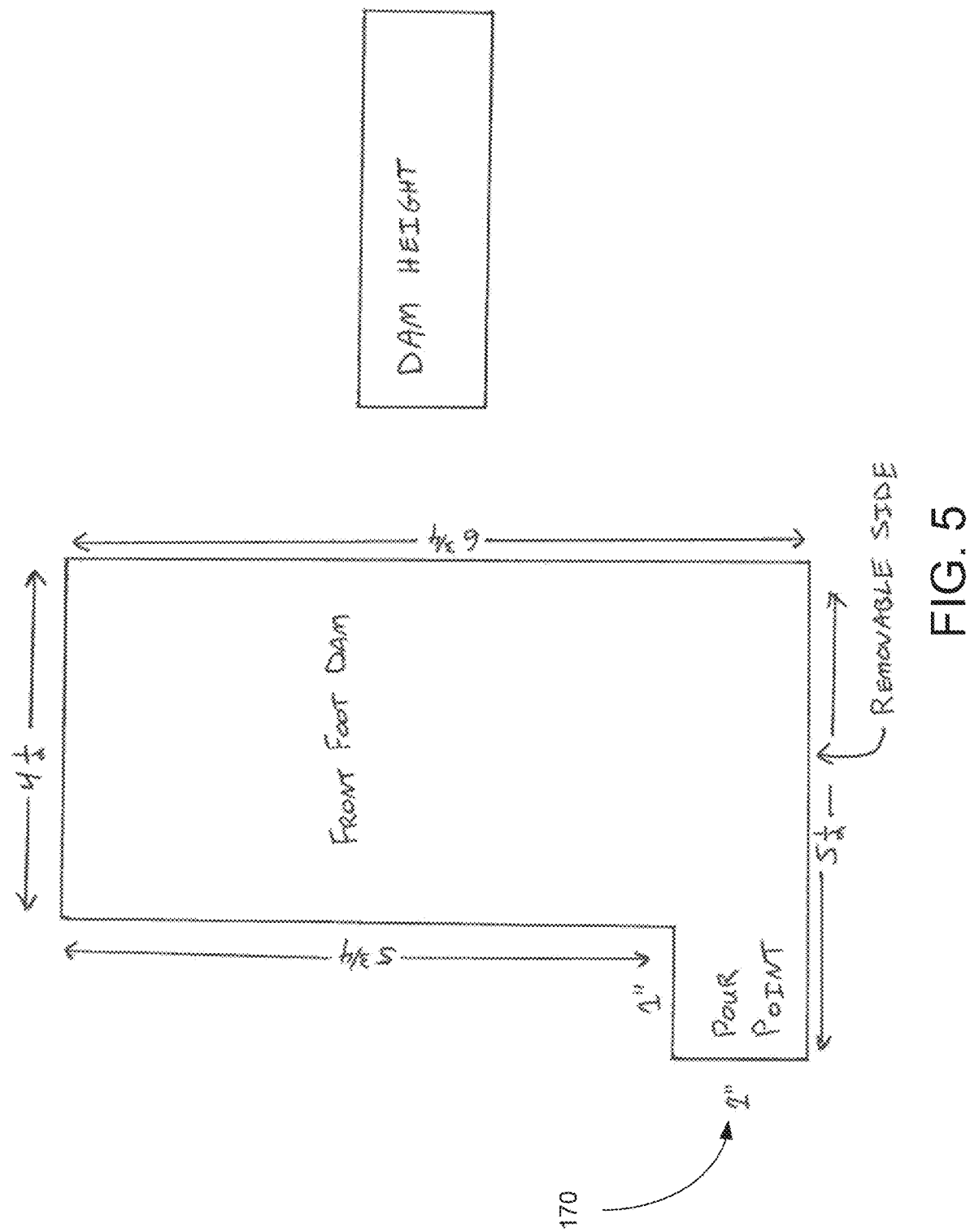
FIG. 5 shows a schematic top plan view of the front-foot chocking compound dam assembly of FIG. 1 illustrating a pour point.

FIG. 5 shows a schematic top plan view of the front-foot chocking compound dam assembly 100 of FIG. 1 illustrating a pour point 170. The pour point 170 shows an example of a location for pouring the chocking compound into the area surrounded by the dam assembly 100.

Figure 6:
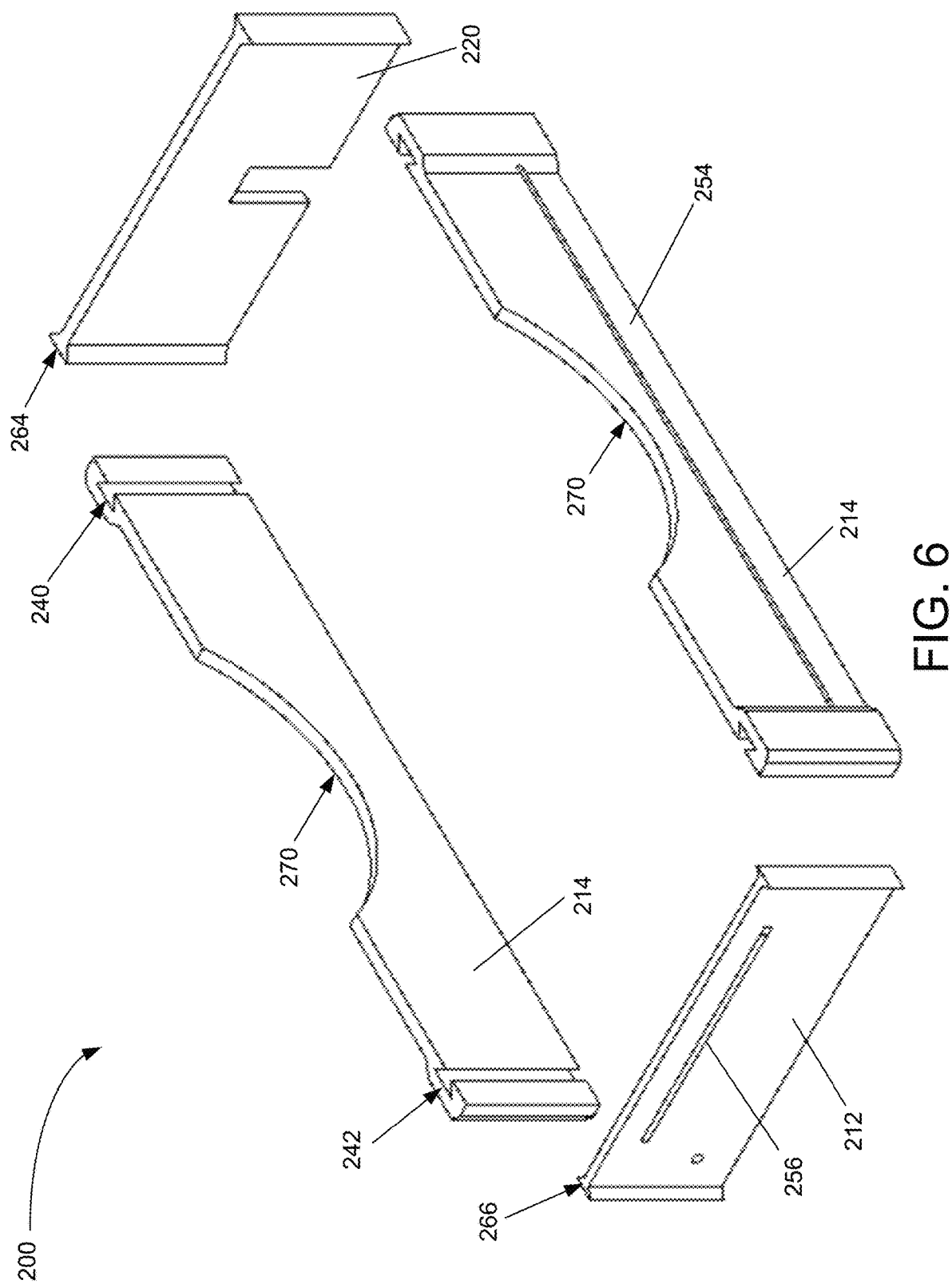
FIG. 6 is an exploded perspective view showing an example of a rear-foot chocking compound dam assembly.
Figure 7:
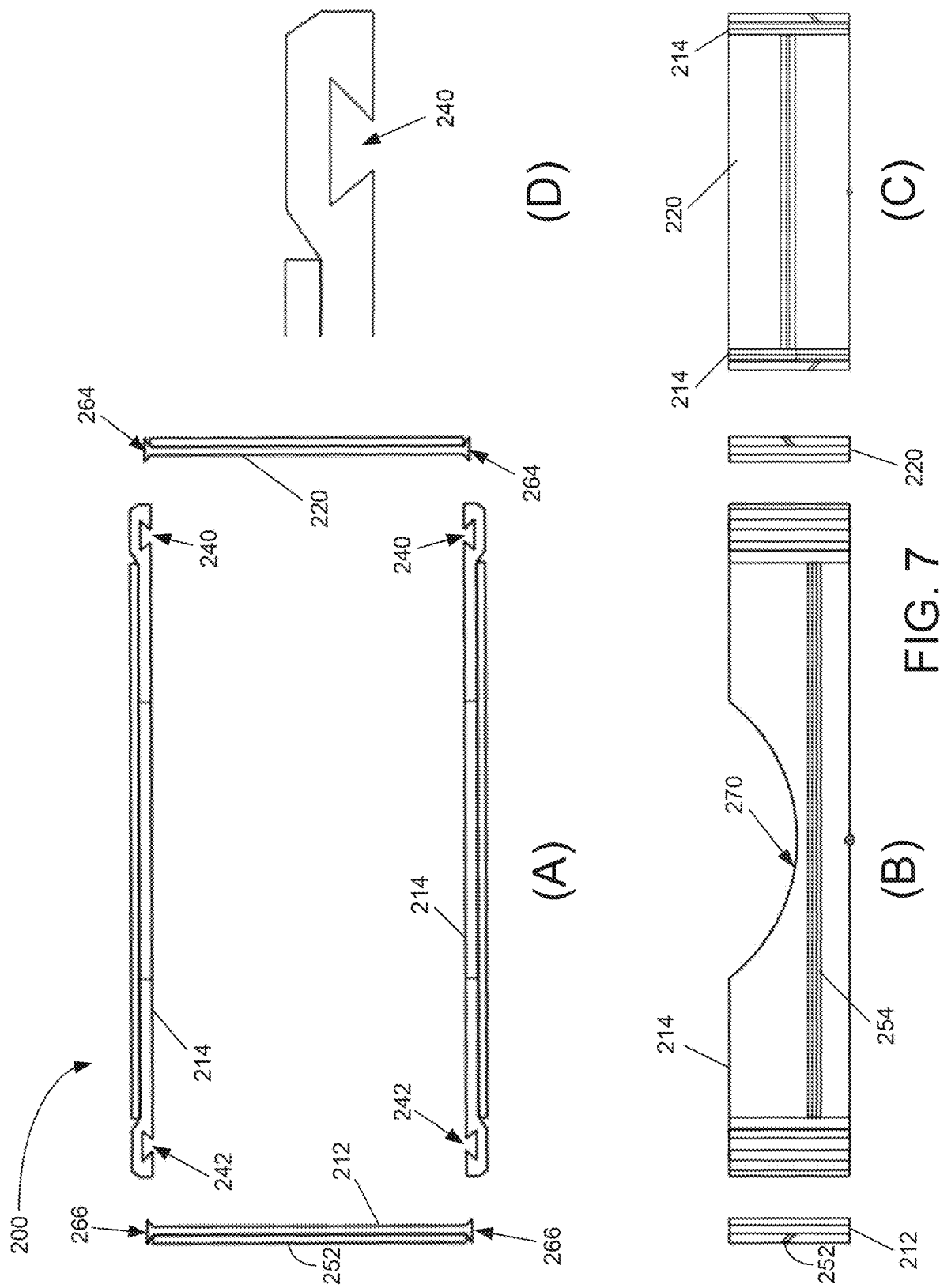
FIG. 7 illustrates the rear-foot chocking compound dam assembly of FIG. 6, including (A) an exploded top plan view, (B) an exploded side elevational view thereof, (C) a front elevational view of a front dam wall of the assembly, and (D) a front dovetail joint cavity of a side dam wall of the assembly.

FIG. 6 is an exploded perspective view showing an example of a rear-foot chocking compound dam assembly 200. FIG. 7 illustrates the rear-foot chocking compound dam assembly of FIG. 6, including (A) an exploded top plan view, (B) an exploded side elevational view thereof, (C) a front elevational view of a front dam wall of the assembly, and (D) a front dovetail joint cavity of a side dam wall of the assembly. The rear-foot chocking compound dam assembly 200 has a rear dam wall 212 (rear transverse piece), two side dam walls 214 (side longitudinal pieces), and a front dam wall 220 (front transverse piece). The rear dam wall 212 may have a rear transverse stiffener 252. The side dam wall 214 may include a longitudinal stiffener 254 protruding transversely from an external surface of the side dam wall 214 at an angle. The front dam wall 220 may have a front transvers stiffener 256.

The side dam walls 214 each have a front dovetail joint cavity 240 and a rear dovetail joint cavity 242. The front dam wall 220 has dovetail ends 264 at opposite sides for engaging the front dovetail joint cavities 240 as a front locking mechanism. The rear dam wall 212 has dovetail ends 266 at opposite ends for engaging the rear dovetail joint cavities 242 as a rear locking mechanism. The side dam walls 214 each may include an upper cutout 270 at or near the middle to provide clearance to accommodate a certain part of the structure (e.g., engine) that extends below the height of the side dam wall 214. In some examples, the front dam wall 220 and the rear dam wall 212 have a smaller height than the side dam walls 214. In other examples, they may have the same height. Because the side dam walls 214 are longer than the front dam wall 220 and the rear dam wall 212, their greater height in some embodiments may render the side dam walls 214 comparable in structural robustness as compared to the shorter front dam wall 220 and rear dam wall 212. In another example, the dam assembly 200 may be mounted on an inclined surface with the front end and the rear end at different heights. As such, the dam wall at the higher end may have a smaller height without letting an overflow of the chocking compound and the dam wall at the lower end has a greater height to prevent overflow of the chocking compound.

Figure 8:
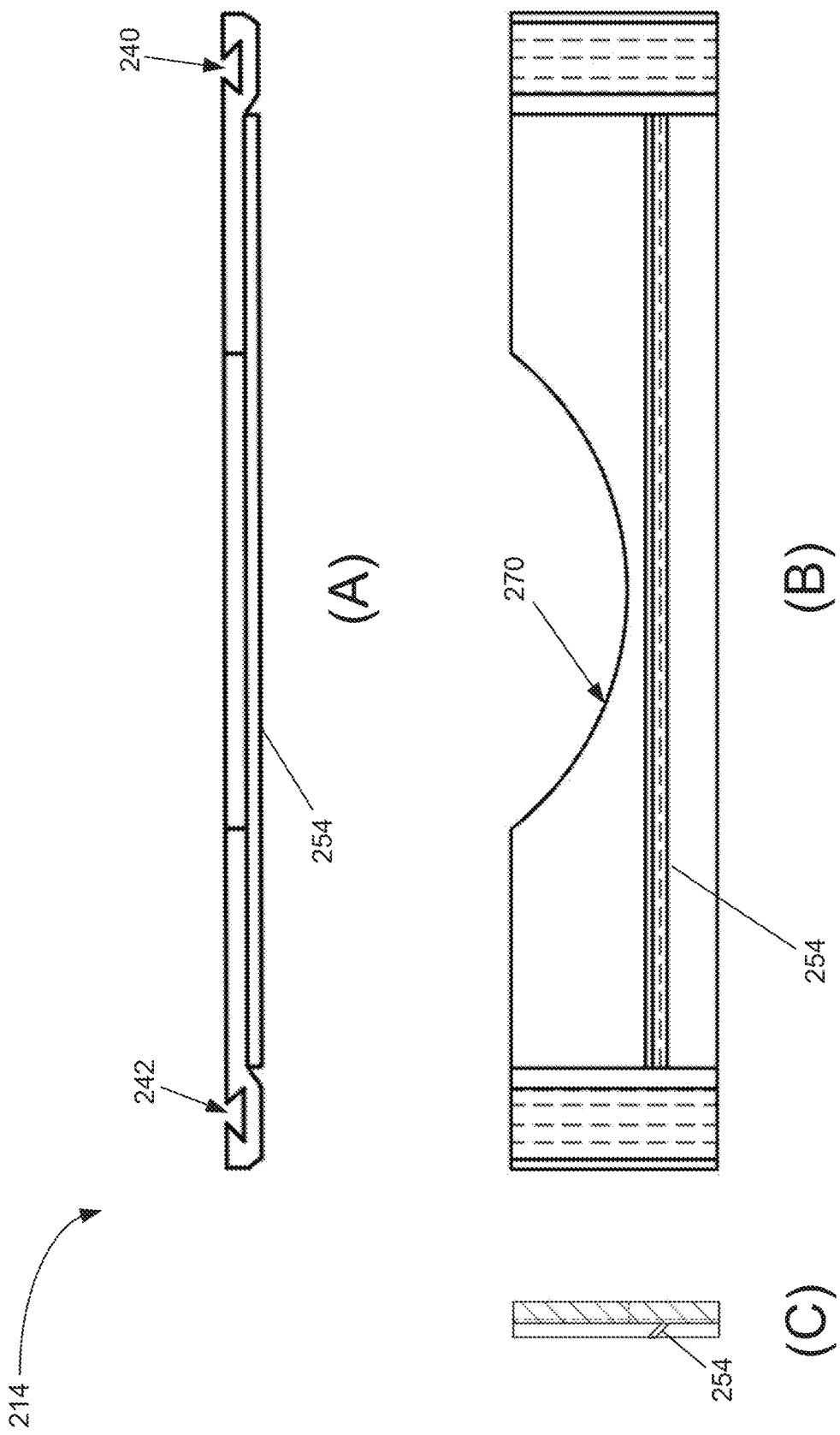
FIG. 8 shows (A) a top plan view, (B) a side elevational view, and (C) a cross-sectional view of the side dam wall of FIG. 6.
Figure 9:
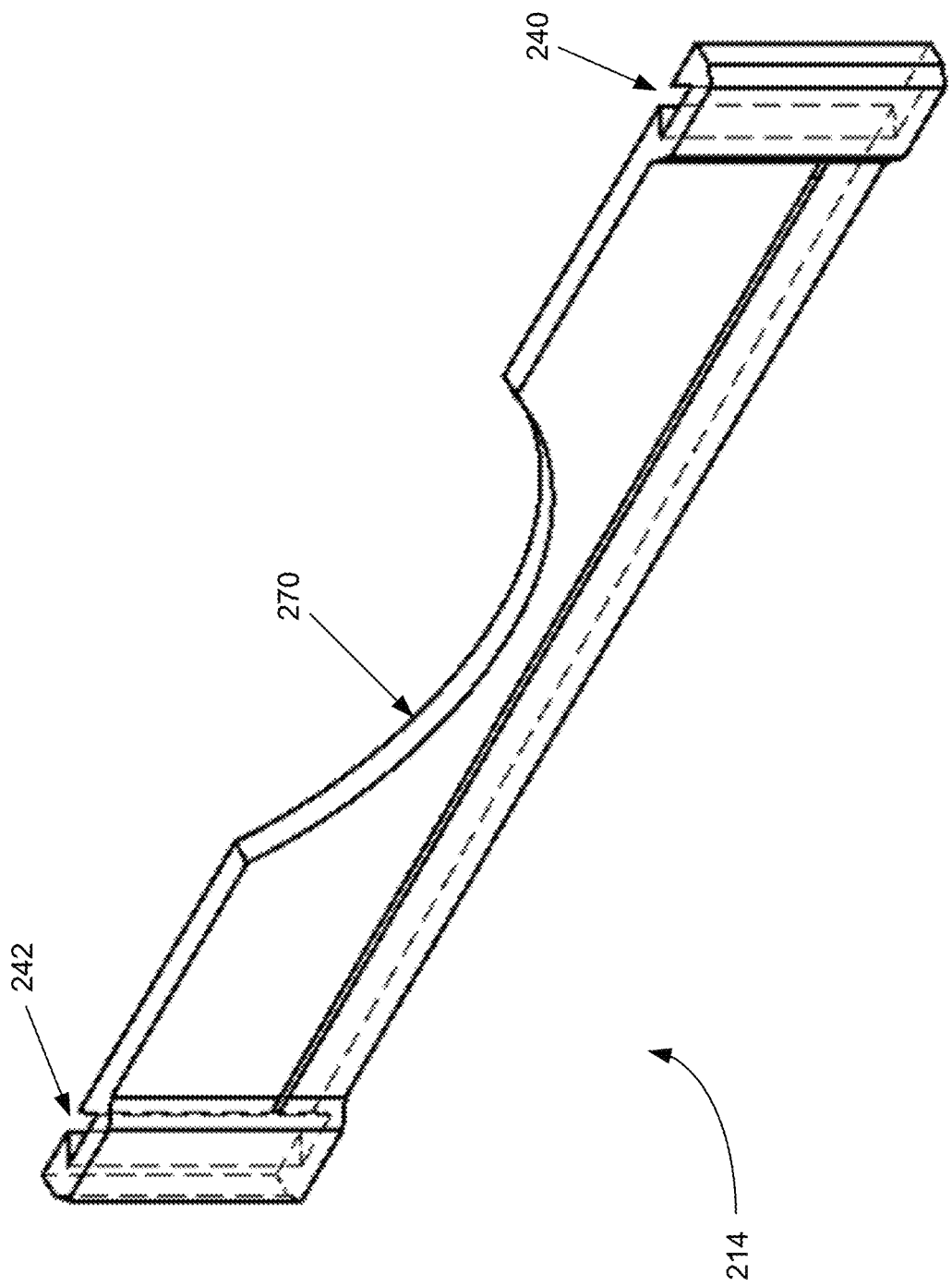
FIG. 9 shows a perspective view of the side dam wall of FIG. 6.

FIG. 8 shows (A) a top plan view, (B) a side elevational view, and (C) a cross-sectional view of the side dam wall 214 of FIG. 6. FIG. 9 shows a perspective view of the side dam wall 214 of FIG. 6. The additional views illustrate details of the longitudinal stiffener 254 and the upper cutout 270. The stiffeners including the longitudinal stiffener 254 may have a 45° configuration. The front dovetail joint cavity 240 or rear dovetail joint cavity 242 has a 45° dovetail configuration in the example shown.

Figure 10:
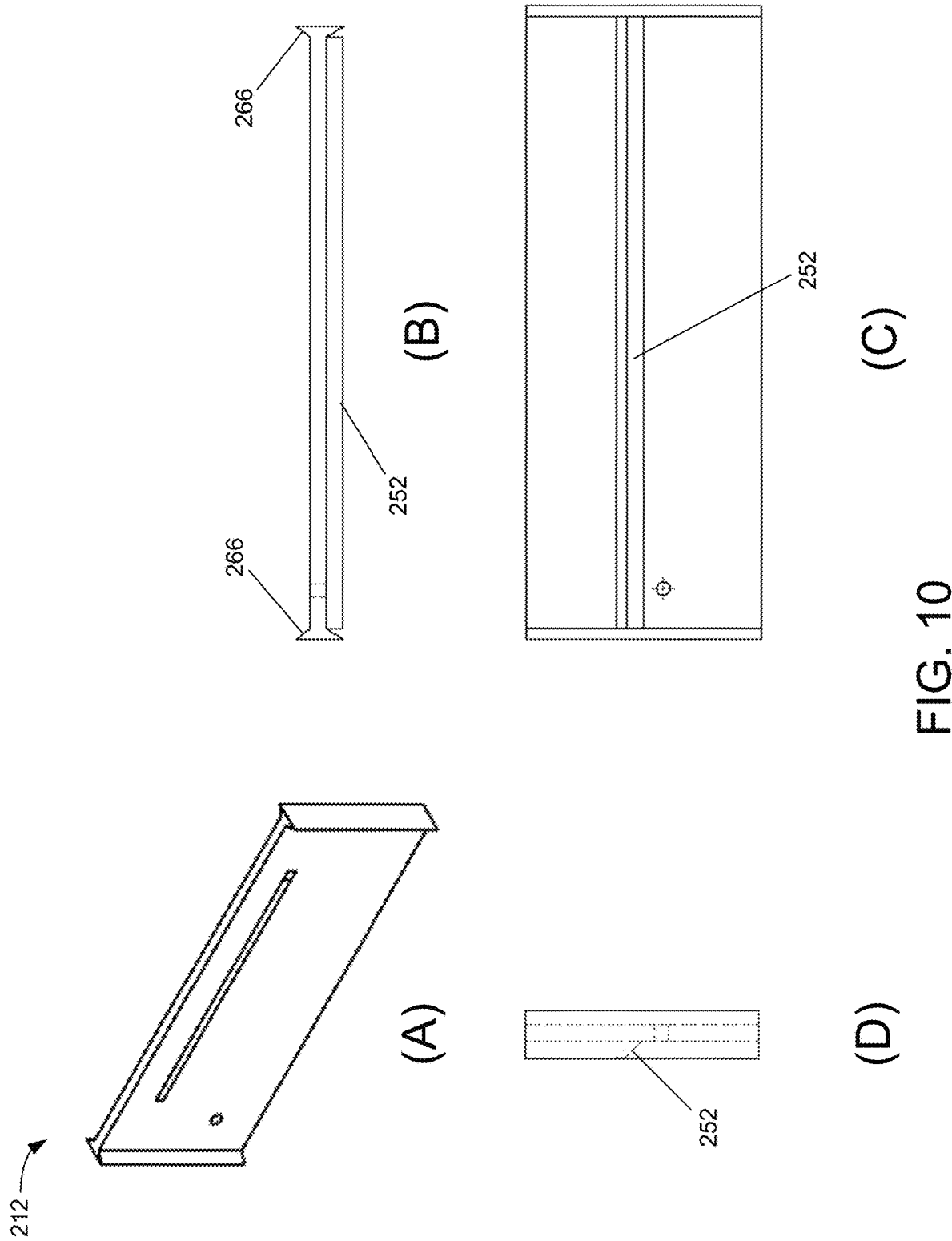
FIG. 10 illustrates (A) a perspective view, (B) a top plan view, (C) a front elevational view, and (D) a cross-sectional view of the rear dam wall of FIG. 6.

FIG. 10 illustrates (A) a perspective view, (B) a top plan view, (C) a front elevational view, and (D) a cross-sectional view of the rear dam wall 212 of FIG. 6. The additional views show details of the rear dam wall 212.

Figure 11:
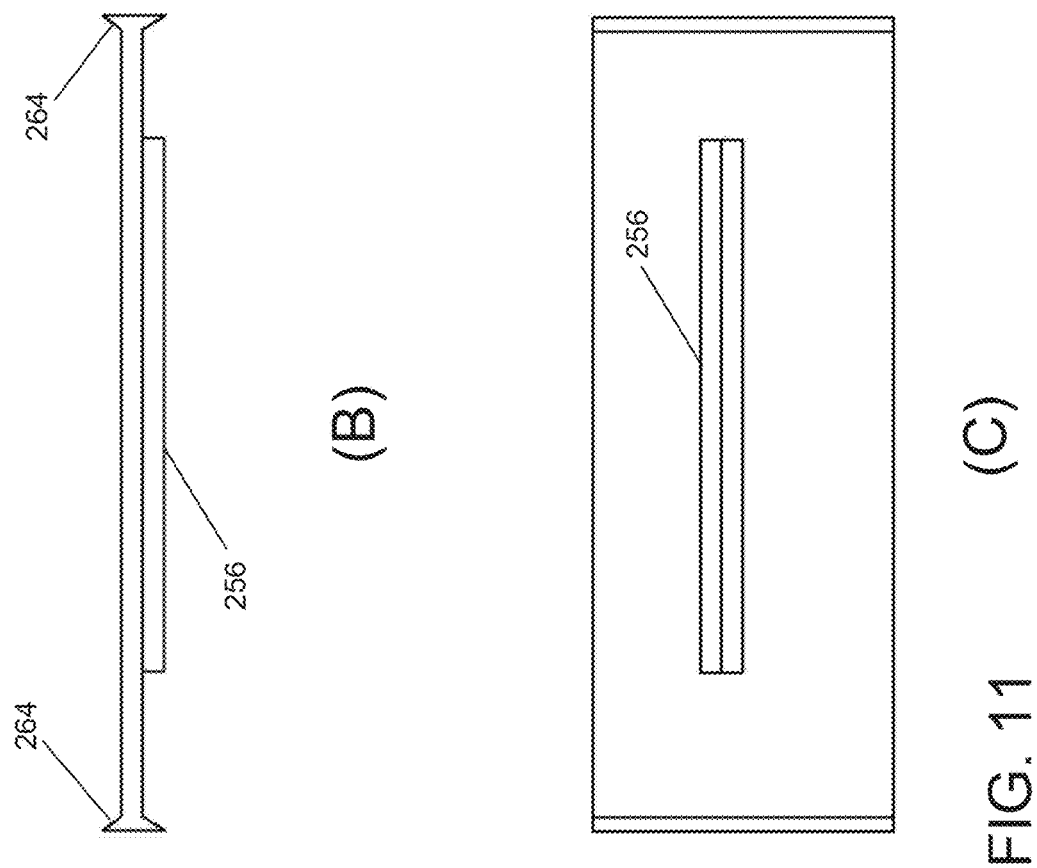
FIG. 11 illustrates (A) a perspective view, (B) a top plan view, (C) a front elevational view, and (D) a cross-sectional view of the front dam wall of FIG. 6.
Figure 11:
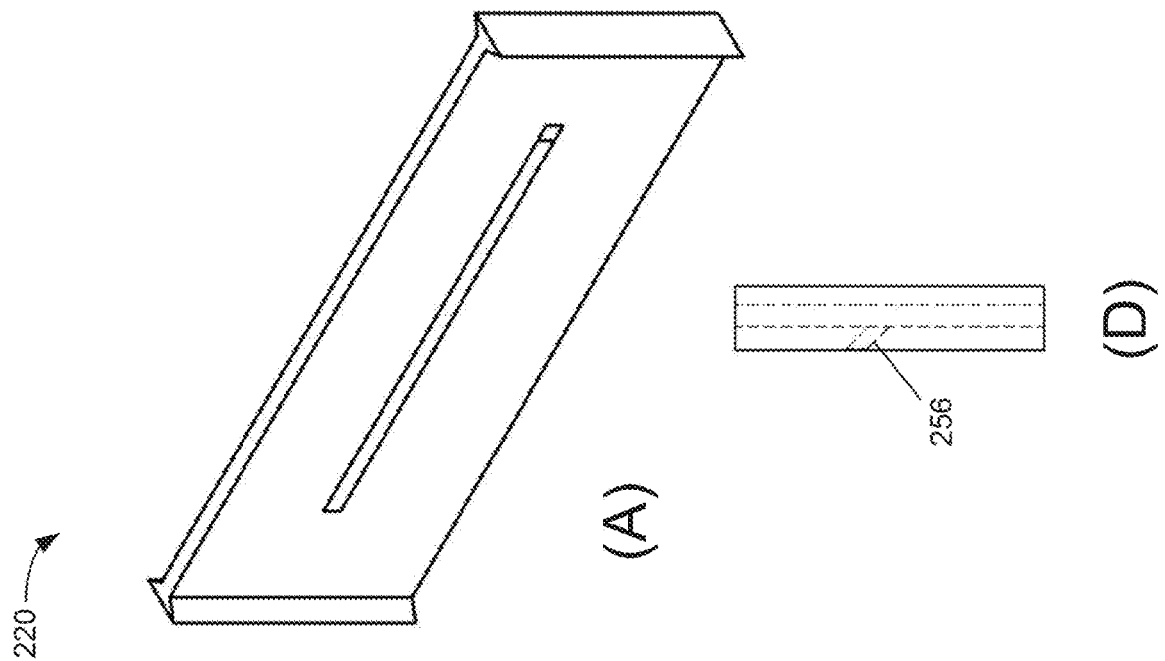

FIG. 11 illustrates (A) a perspective view, (B) a top plan view, (C) a front elevational view, and (D) a cross-sectional view of the front dam wall 220 of FIG. 6. The additional views show details of the front dam wall 220.

Figure 12:
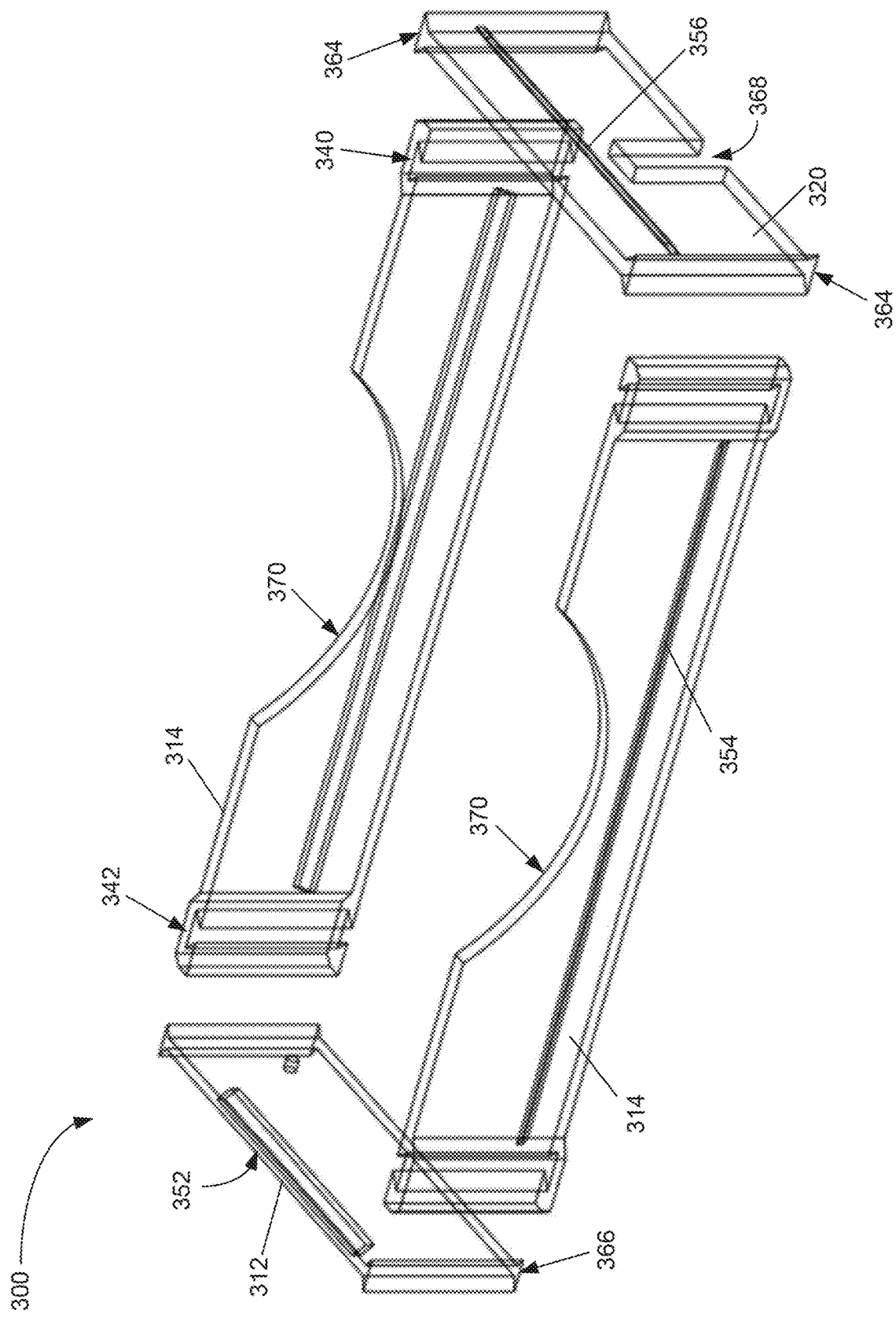
FIG. 12 illustrates another example of a rear-foot chocking compound dam assembly.

FIG. 12 illustrates another example of a rear-foot chocking compound dam assembly 300 having a rear dam wall 312 (rear transverse piece), two side dam walls 314 (side longitudinal pieces), and a front dam wall 320 (front transverse piece). The rear dam wall 312 may have a rear transverse stiffener 352. The side dam wall 314 may include a longitudinal stiffener 354. The front dam wall 320 may have a front transvers stiffener 356.

The side dam walls 314 each have a front dovetail joint cavity 340 and a rear dovetail joint cavity 342. The front dam wall 320 has dovetail ends 364 at opposite sides for engaging the front dovetail joint cavities 340 as a front locking mechanism. The rear dam wall 312 has dovetail ends 366 at opposite ends for engaging the rear dovetail joint cavities 342 as a rear locking mechanism. The side dam walls 314 each may include an upper cutout 370 at or near the middle similar to the example shown in FIG. 6. In this example, however, the rear dam wall 312 has the same height as the side dam walls 314 and the front dam wall 320 has a greater height than the side dam walls 314. The greater height of the front dam wall 320 allows it to have a lower opening or cutout 368 without compromising (at least not substantially) the structural integrity of the front dam wall 320. As such, the front dam wall 320 has a horseshoe or an inverted U-shaped configuration. The lower cutout 368 in this example has approximately the same height as the side dam walls 314. The purpose of the lower cutout 368 may be to accommodate a nut or some other component or structure on the engine bed on which the dam assembly 300 is mounted.

Figure 13:
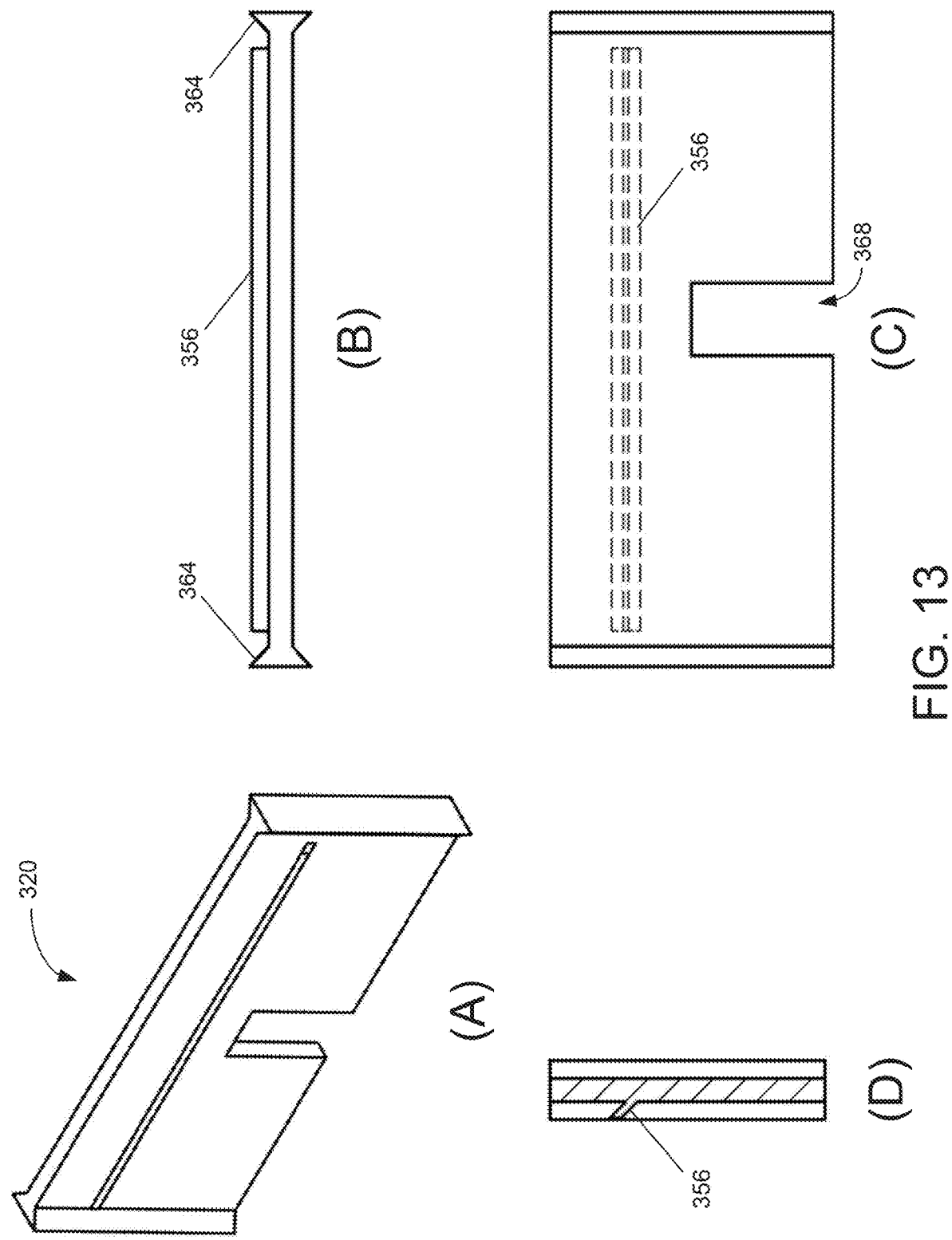
FIG. 13 illustrates (A) a perspective view, (B) a top plan view, (C) a front elevational view, and (D) a cross-sectional view of the front dam wall of FIG. 12 having the horseshoe configuration.

FIG. 13 illustrates (A) a perspective view, (B) a top plan view, (C) a front elevational view, and (D) a cross-sectional view of the front dam wall 320 of FIG. 12 having the horseshoe configuration. The additional views show details of the front dam wall 320.

Figure 14:
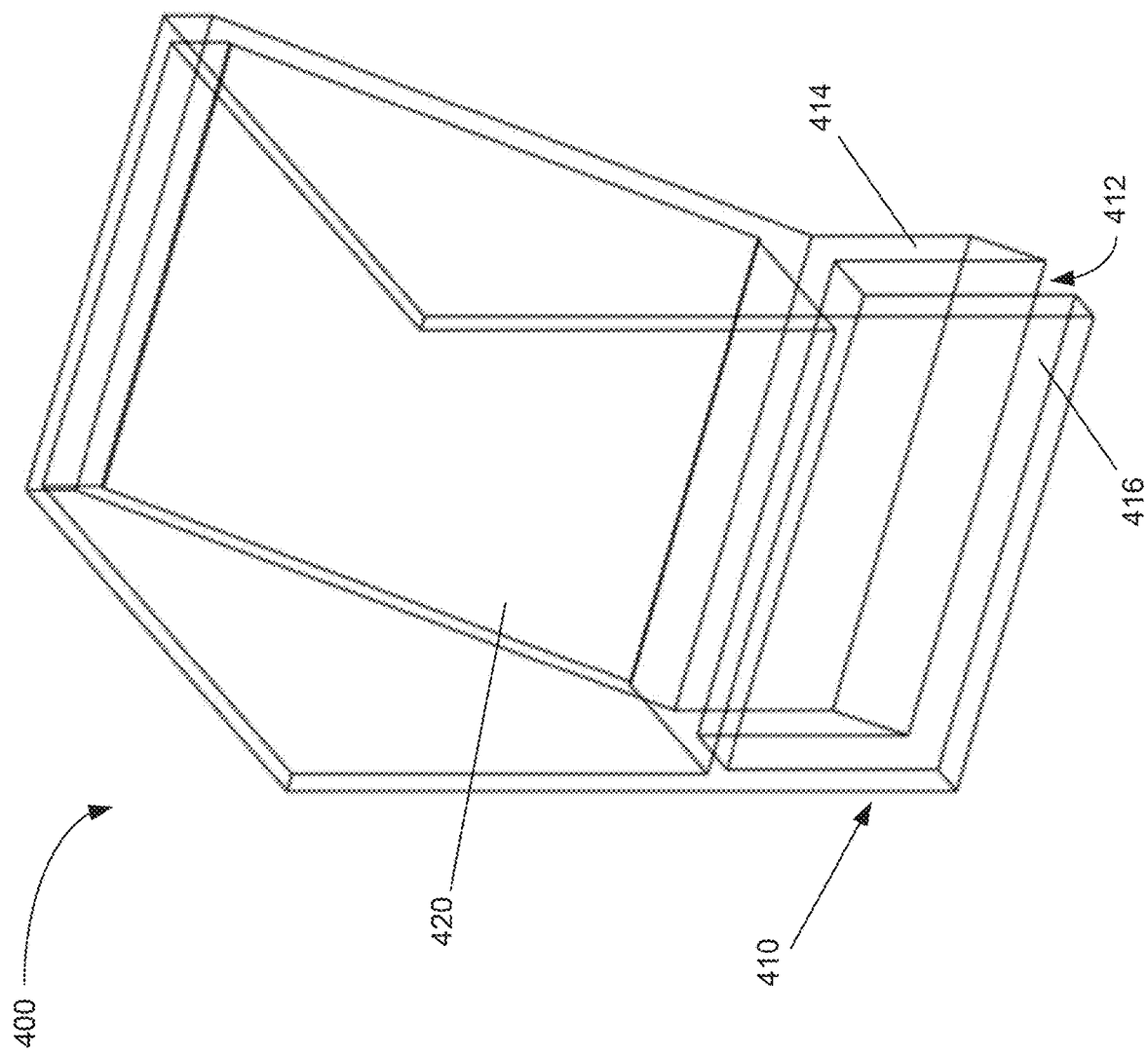
FIG. 14 is a perspective view showing an example of a pour spout clip.
Figure 15:
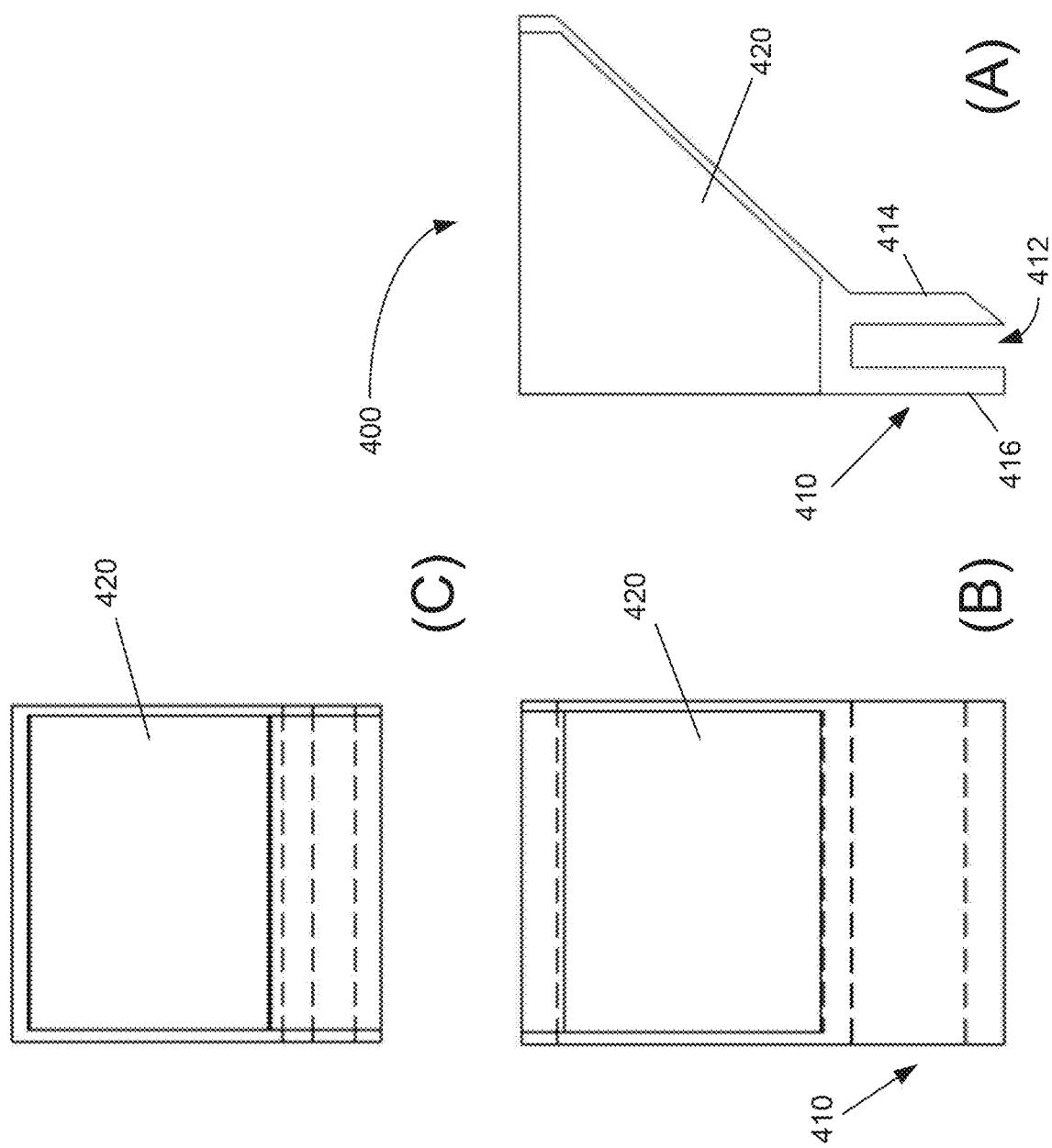
FIG. 15 illustrates the pour spout clip of FIG. 14, including (A) a side elevational view, (B) a front elevational view, and (C) a top plan view thereof.

FIG. 14 is a perspective view showing an example of a pour spout clip 400. FIG. 15 illustrates the pour spout clip of FIG. 14, including (A) a side elevational view, (B) a front elevational view, and (C) a-rear elevational top plan view thereof. The pour spout clip 400 has a lower clip portion 410 connected to an upper pour portion 420 which is disposed at an angle of, for instance, about 30° to about 60°. The lower clip portion 410 includes a downward facing slot 412, defined between an internal panel 414 and an external panel 416, to receive the upper edge of the prefabricated dam wall. The upper pour portion 420 extends outwardly from the lower clip portion 410 and is disposed outside a boundary of the dam provided by the dam walls. The clip portion 410 clips to a dam wall of the dam assembly at a pour point (e.g., pour point 170 in FIG. 5) to support and stabilize the pour spout clip 400 and allow the chocking compound to be poured into the area surrounded by the dam walls via the pour portion 420. The clip portion 410 may be configured to extend over substantially the height of the dam wall at the pour point or, if the dam wall has a stiffener, to the level of the stiffener (e.g., stiffener 254 in FIG. 8). In the example shown, the external panel of the clip portion has a 45° edge to match the 45° stiffener of the dam wall and firmly fix it in place.

Figure 16:
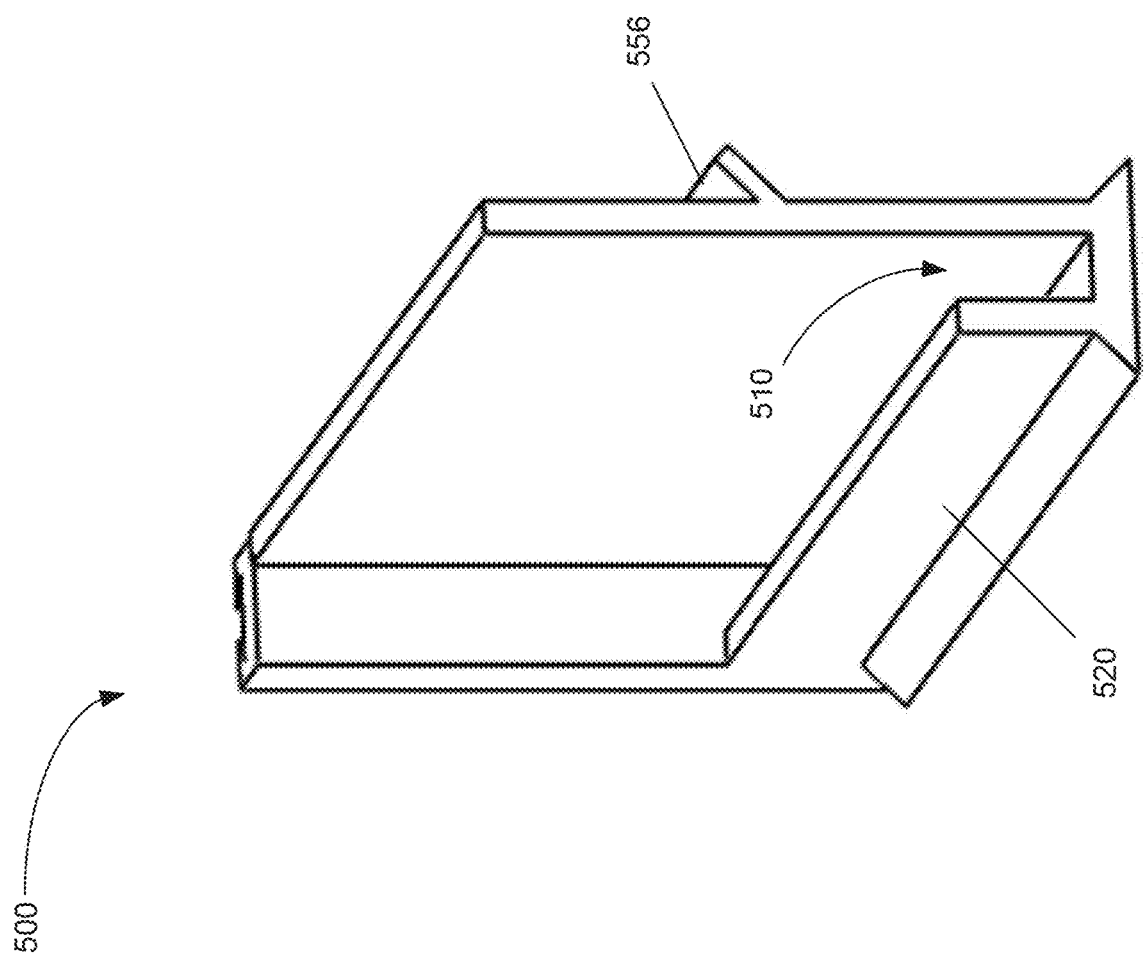
FIG. 16 is a first perspective view showing an example of a dam wall having a cooling slot.
Figure 17:
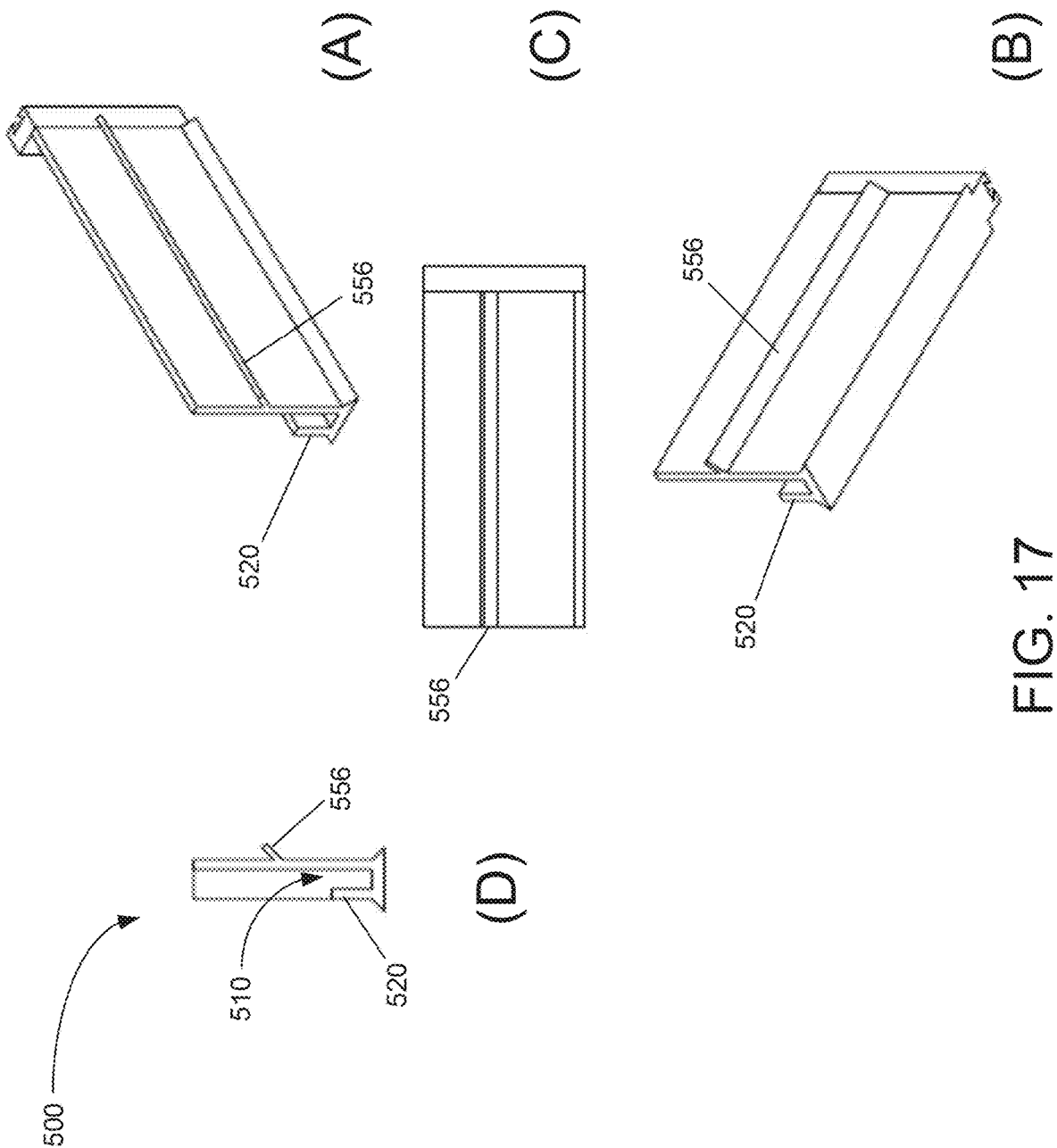
FIG. 17 illustrates the dam wall of FIG. 16, including (A) a second perspective view, (B) a third perspective view, (C) a side elevational view, and (D) a front elevational view thereof.

FIG. 16 is a first perspective view showing an example of a dam wall having a cooling slot 510. FIG. 17 illustrates the dam wall of FIG. 16, including (A) a second perspective view, (B) a third perspective view, (C) a side elevational view, and (D) a front elevational view thereof. The dam wall 500 has a stiffener 556 on an exterior surface. The cooling slot 510 is provided between an interior surface of the dam wall 500 and a panel 520 which is parallel to the dam wall 500 and has a fraction (e.g., 10-30%) of the height of the dam wall 500.

The cooling slot 510 is disposed adjacent the chocking compound pour area to receive a cooling member. The slotted piece or wall 500 allows a piece of metal to be added to the dam without altering watertight integrity or construction. The metal piece or bar is placed into the cooling slot 510. If the chocking compound is poured into an area with very little surface area touching other metal or the ambient air, a piece of flat bar can be inserted to assist with heat dissipation and achieve a more uniform setting of the chock. The metal piece or bar acts as a heat transfer cooling member placed in the cooling slot 510. Other suitable cooling members may be used in other embodiments. Any wall configuration can accommodate the cooling slot geometry when additively manufactured.

Figure 18:
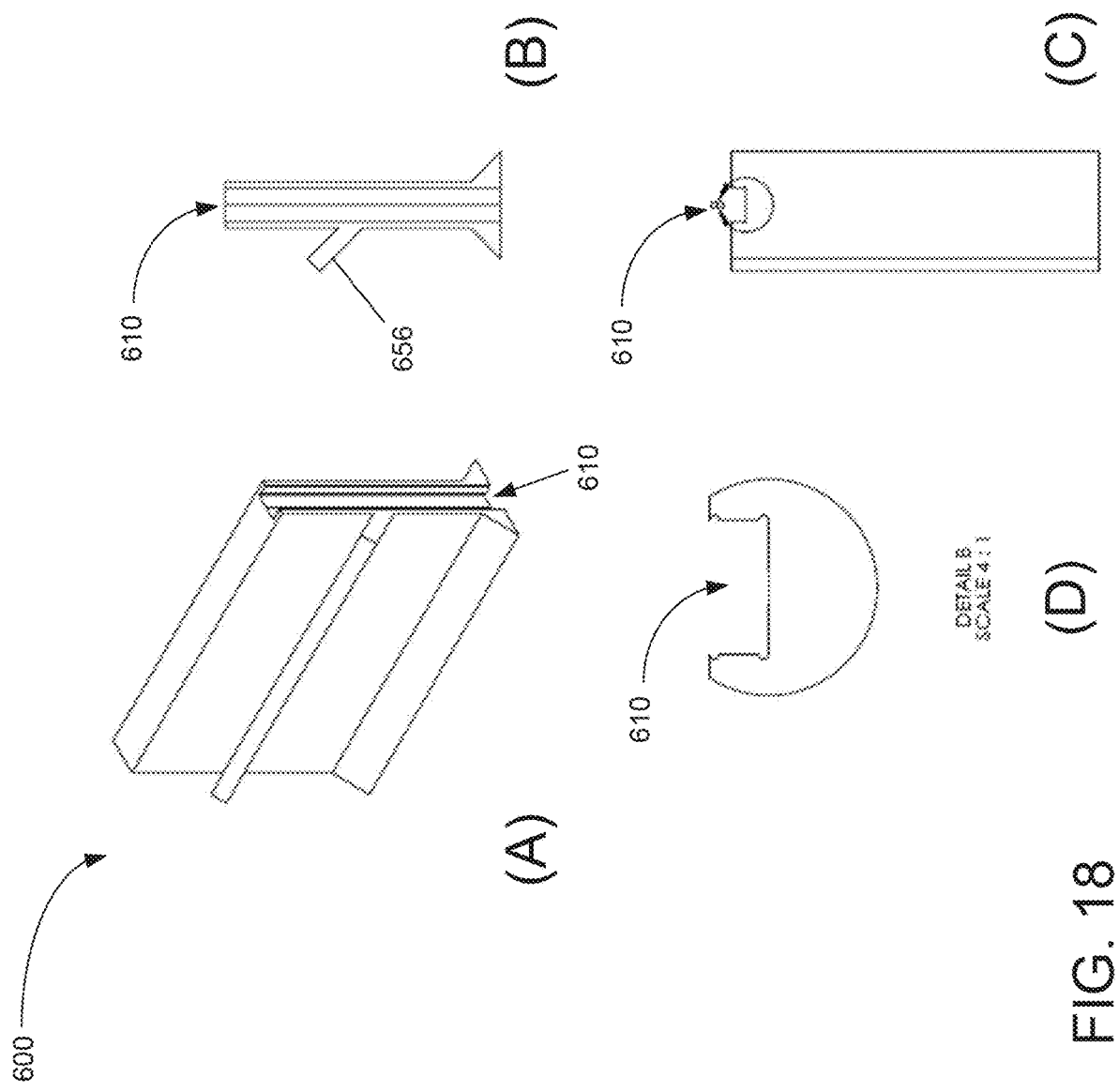
FIG. 18 illustrates an example of a first dam wall having an external clip, including (A) a first perspective view, (B) a front elevational view, (C) a bottom plan view, and (D) a DETAIL B view thereof.
Figure 19:
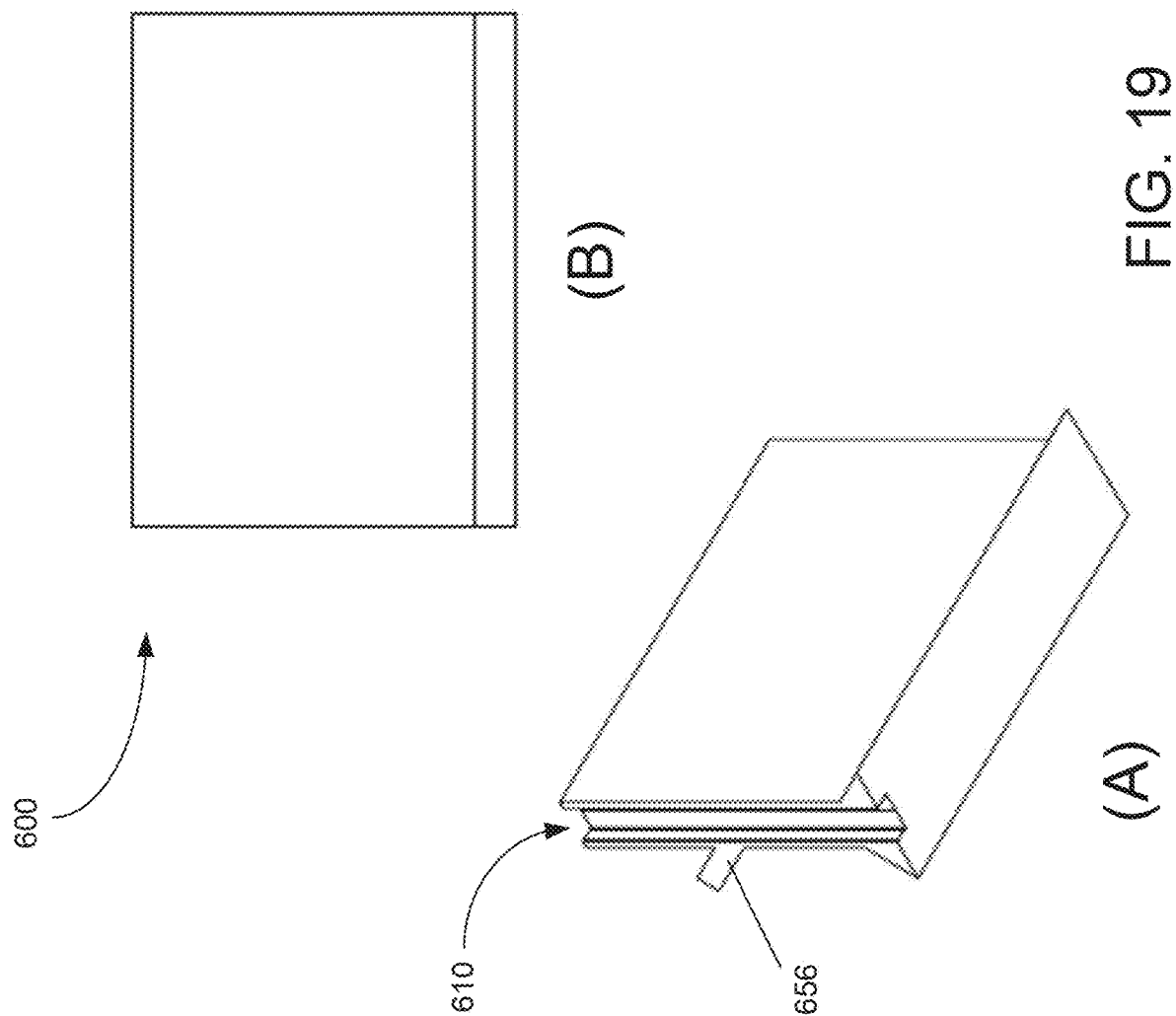
FIG. 19 illustrates the first dam wall of FIG. 18, including (A) a second perspective view and (B) a side elevational view thereof.

FIG. 18 illustrates an example of a first dam wall 600 having an external clip 610, including (A) a first perspective view, (B) a front elevational view, (C) a bottom plan view, and (D) a DETAIL B view thereof. FIG. 19 illustrates the first dam wall of FIG. 18, including (A) a second perspective view and (B) a side elevational view thereof. The first dam wall 600 has a stiffener 656 on an exterior surface. The external clip 610 is provided along a side edge as a first mating edge of the first dam wall 600 and extends along its entire height. The external clip 610 forms a female mating portion along the first mating edge of the first dam wall 600.

Figure 20:
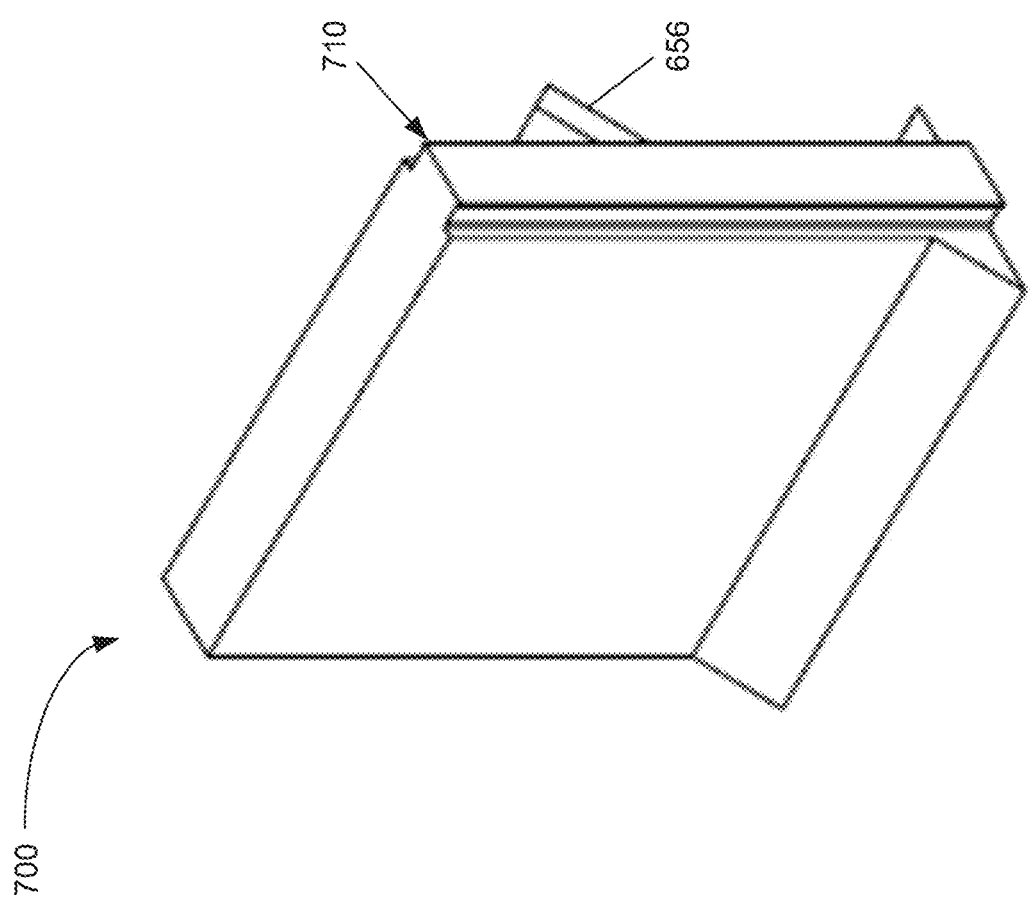
FIG. 20 is a perspective view showing an example of a second dam wall having an internal clip.
Figure 21:
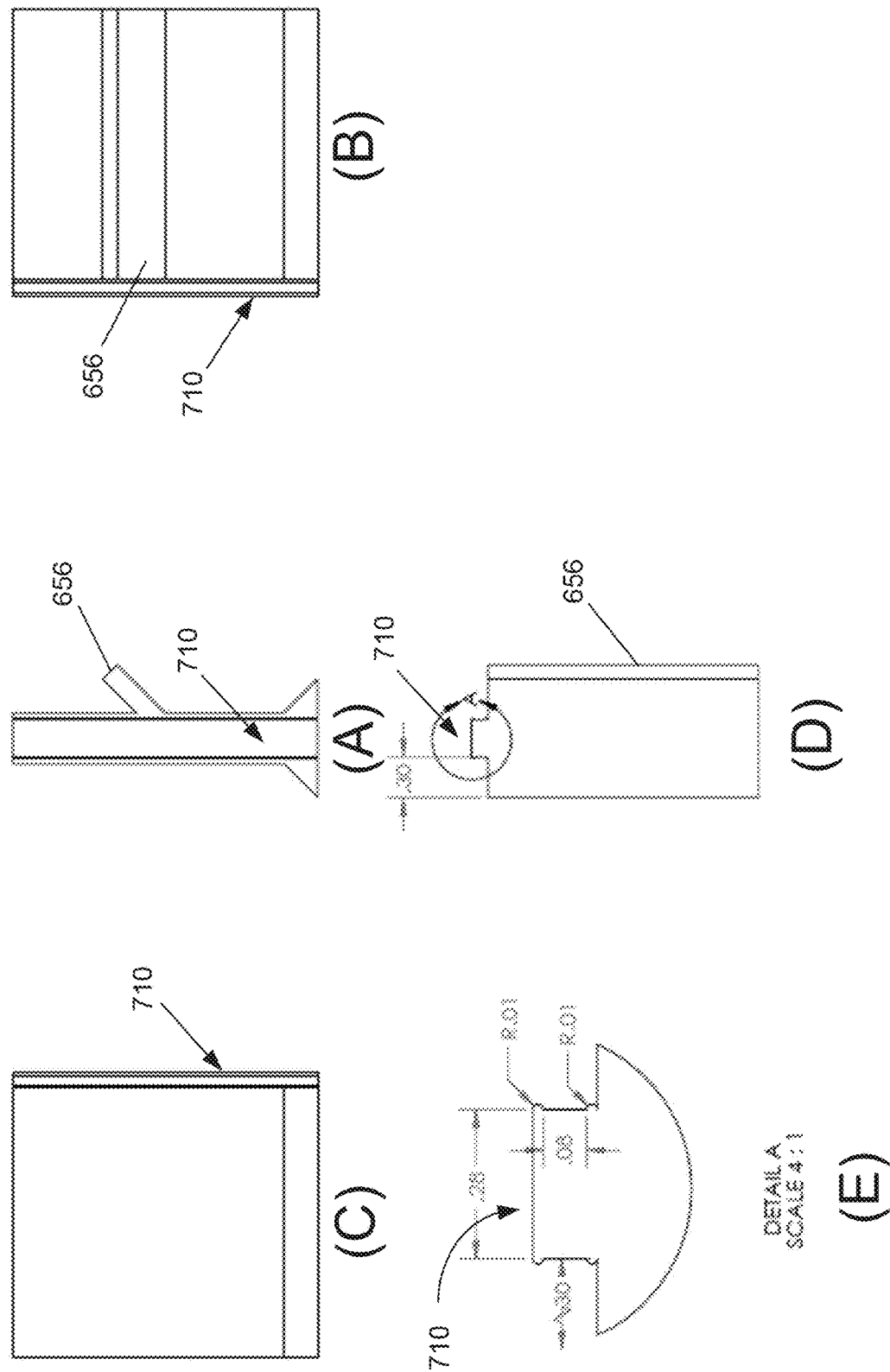
FIG. 21 illustrates the second dam wall of FIG. 20, including (A) a front elevational, (B) a right side elevational view, (C) a left side elevational view, (D) a top plan view, and (E) a DETAIL A view thereof.

FIG. 20 is a perspective view showing an example of a second dam wall having an internal clip 710. FIG. 21 illustrates the second dam wall of FIG. 20, including (A) a front elevational, (B) a right side elevational view, (C) a left side elevational view, (D) a top plan view, and (E) a DETAIL A view thereof. The internal clip 710 is provided along a side edge as a second mating edge of the second dam wall 700 and extends along its entire height. The internal clip 710 forms a male mating portion along the second mating edge of the second dam wall 700.

Figure 22:
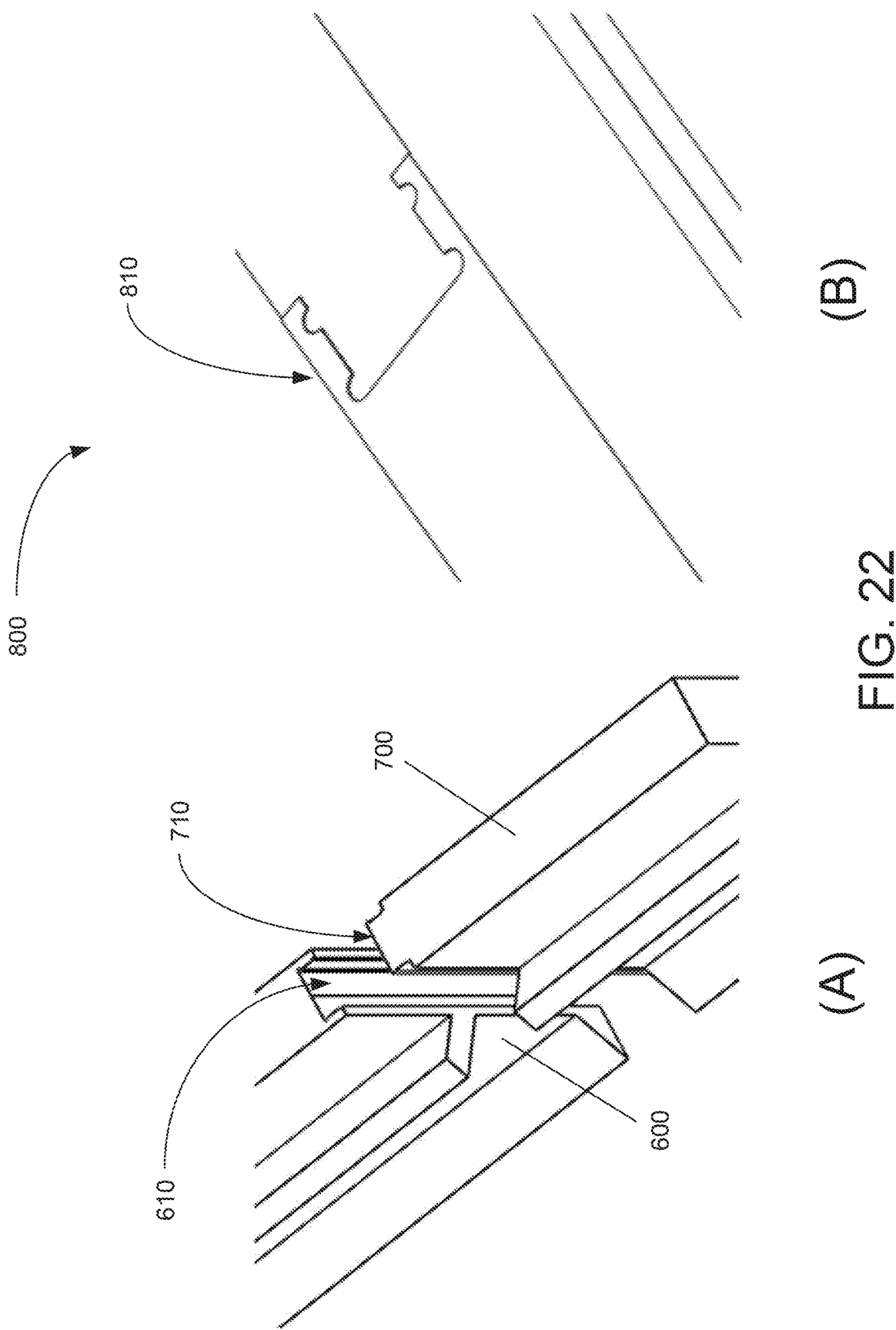
FIG. 22 illustrates a joined dam wall by connecting the external clip of the first dam wall of FIG. 20 and the internal clip of the second dam wall of FIG. 21, including (A) a perspective view of the dam walls before connecting and (B) a perspective view of the dam walls after connecting.

FIG. 22 illustrates a joined dam wall 800 by connecting the external clip 610 of the first dam wall 600 of FIG. 20 and the internal clip 710 of the second dam wall 700 of FIG. 21, including (A) a perspective view of the dam walls before connecting and (B) a perspective view of the dam walls after connecting. The external clip 610 of the first dam wall 600 and the internal clip 710 of the second dam wall 700 are configured to form a male-to-female mating connection or clipped connection 810, resulting in an extended, joined dam wall 800. This facilitates a modular system of interconnecting dam walls for constructing dams of different sizes and shapes. The clipped connection may be a friction fit connection by pushing the external clip 610 and the internal clip

710 toward one another. They may be separated by pulling apart the external clip 610 and the internal clip 710 or by sliding them apart. This locking system can be used instead of the dovetail or in combination with the dovetail, based upon whether access is available in the height direction or the horizontal length direction.

Figure 23:
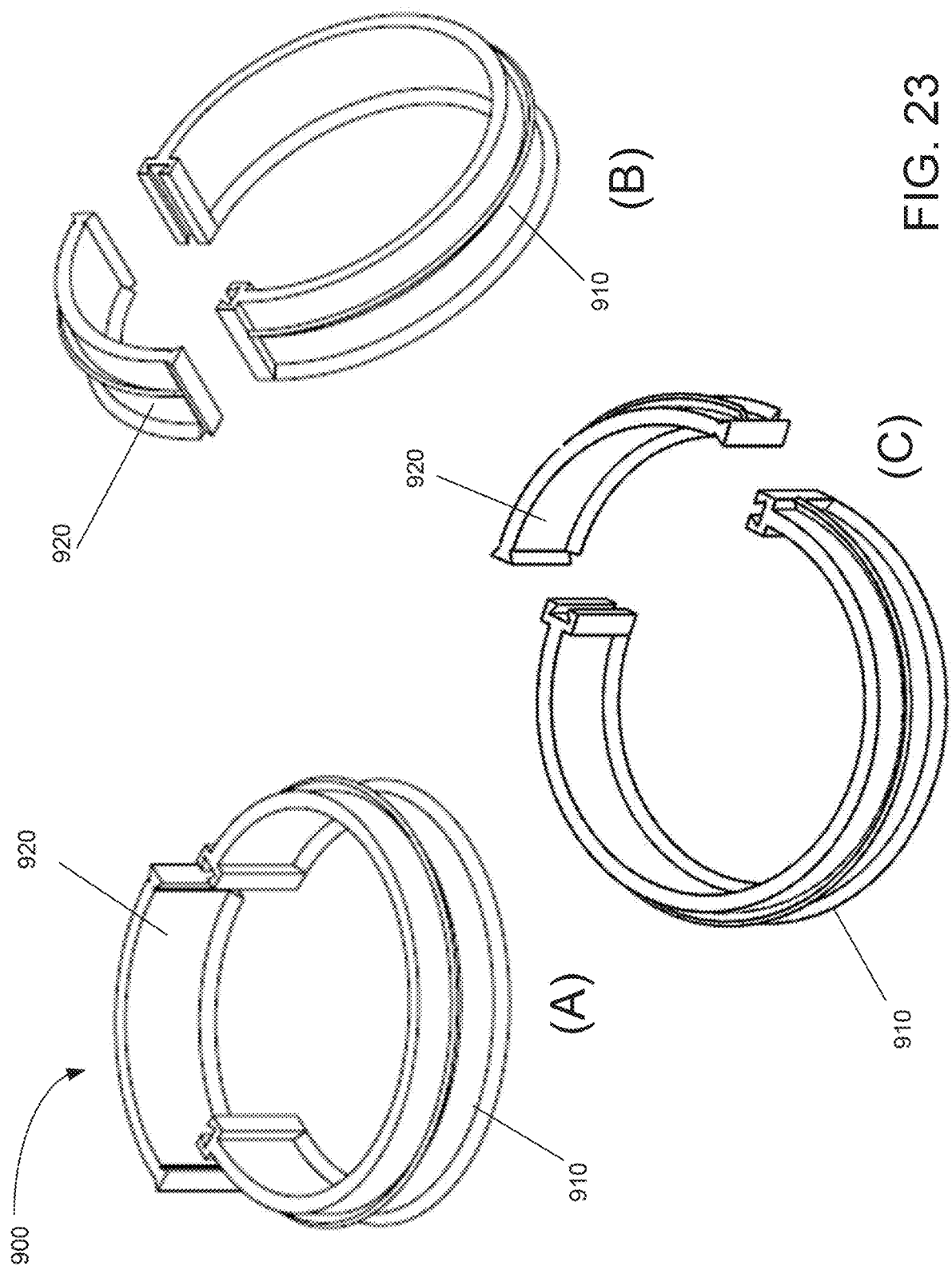
FIG. 23 illustrates an example of a curved chocking compound dam assembly, including (A) a first exploded perspective view, (B) a second exploded perspective view, and (C) a third exploded perspective view thereof.

FIG. 23 illustrates an example of a curved chocking compound dam assembly 900, including (A) a first exploded perspective view, (B) a second exploded perspective view, and (C) a third exploded perspective view thereof. The curved chocking compound dam assembly 900 has a first curved dam wall 910 and a second curved dam wall 920. The first curved dam wall 910 and second curved dam wall 920 have stiffeners and dovetail joints for making dovetail connections with one another in a manner similar to the rectangular dam assemblies of FIGS. 1-16 above. The first curved dam wall 910 and the second curved dam wall 920 may form a circular dam, an oval dam, or some other curved dam surrounding a curved chocking compound pour area.

Figure 24:
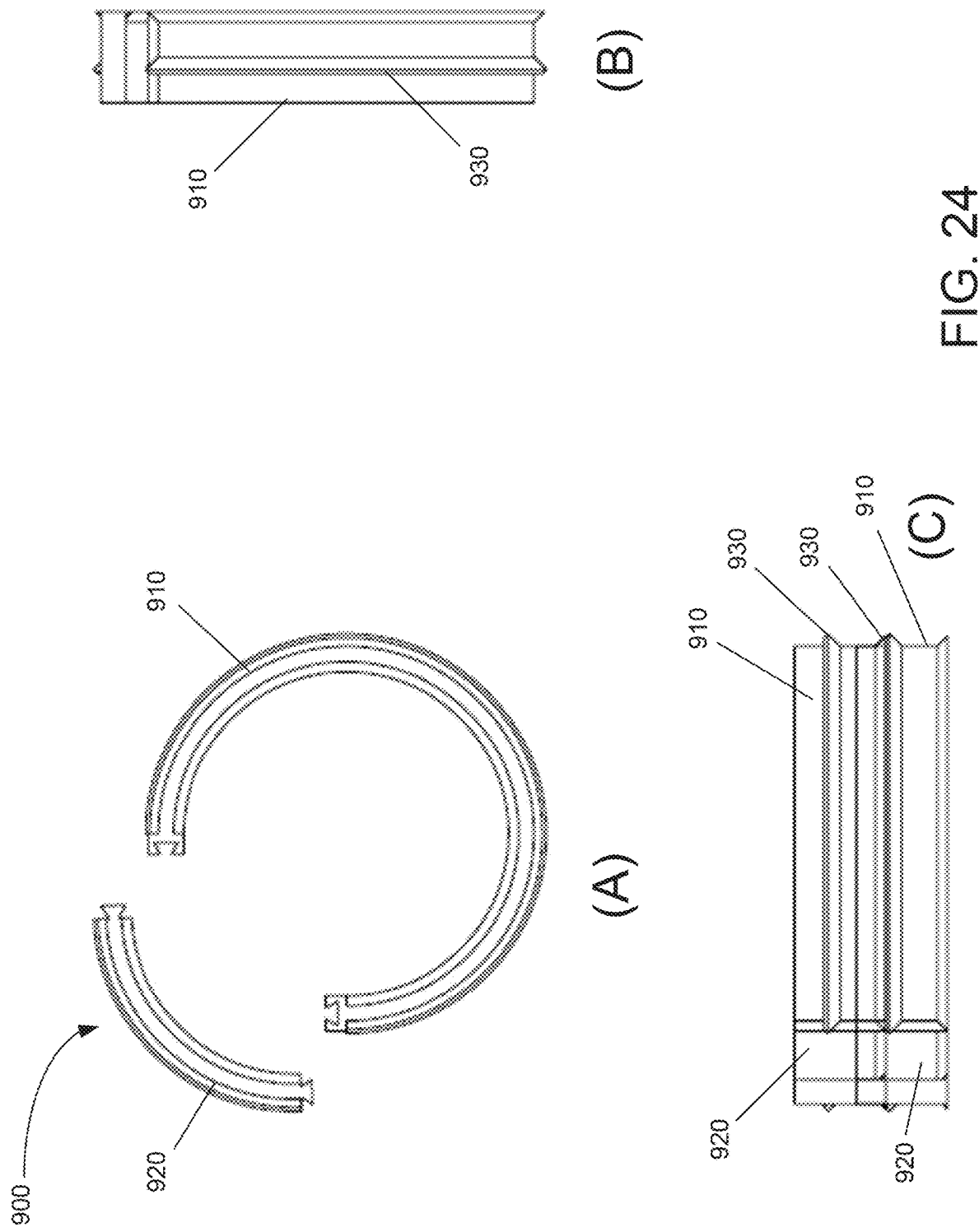
FIG. 24 shows (A) an exploded top plan view, (B) an elevational view, and (C) a stacked elevational view of the curved chocking compound dam assembly of FIG. 23.

FIG. 24 shows (A) an exploded top plan view, (B) an elevational view, and (C) a stacked elevational view of the curved chocking compound dam assembly 900 of FIG. 23. In view (C), two sets of dam walls 910, 920 are in a stacked configuration along the height direction. The stacked dam walls 910, 920 may be interconnected or locked in a modular manner to provide a dam of a greater height. The stacked dam walls may be identical and may be made of the same material. Alternatively, the stacked dam walls may be made of different material having different properties such as mechanical properties, heat transfer properties, or the like. The different heat transfer properties may provide different cooling rates of the chocking compound poured into the dam.

Alternatively, if the required dam is excessively deep, multiple stiffeners or support fins can be added to the outside of the dam wall to improve rigidity. As such, the embodiment in FIG. 24 having two stiffeners 930 may represent a single dam wall having two stiffeners spaced over a relatively large height.

The interlocking curved or circular pieces also facilitate the need for round or curved dams, greatly expanding the many potential ways the dam assembly or kit can be utilized. The pieces can be prefabricated in a circular, elliptical, oval, or other curved shapes. The curved walls or pieces may be combined with the straight walls or pieces to accommodate a greater variety of geometries for the dam. The dam can be created in two or more pieces depending on the accessibility and interferences to the foundation.

Figure 25:
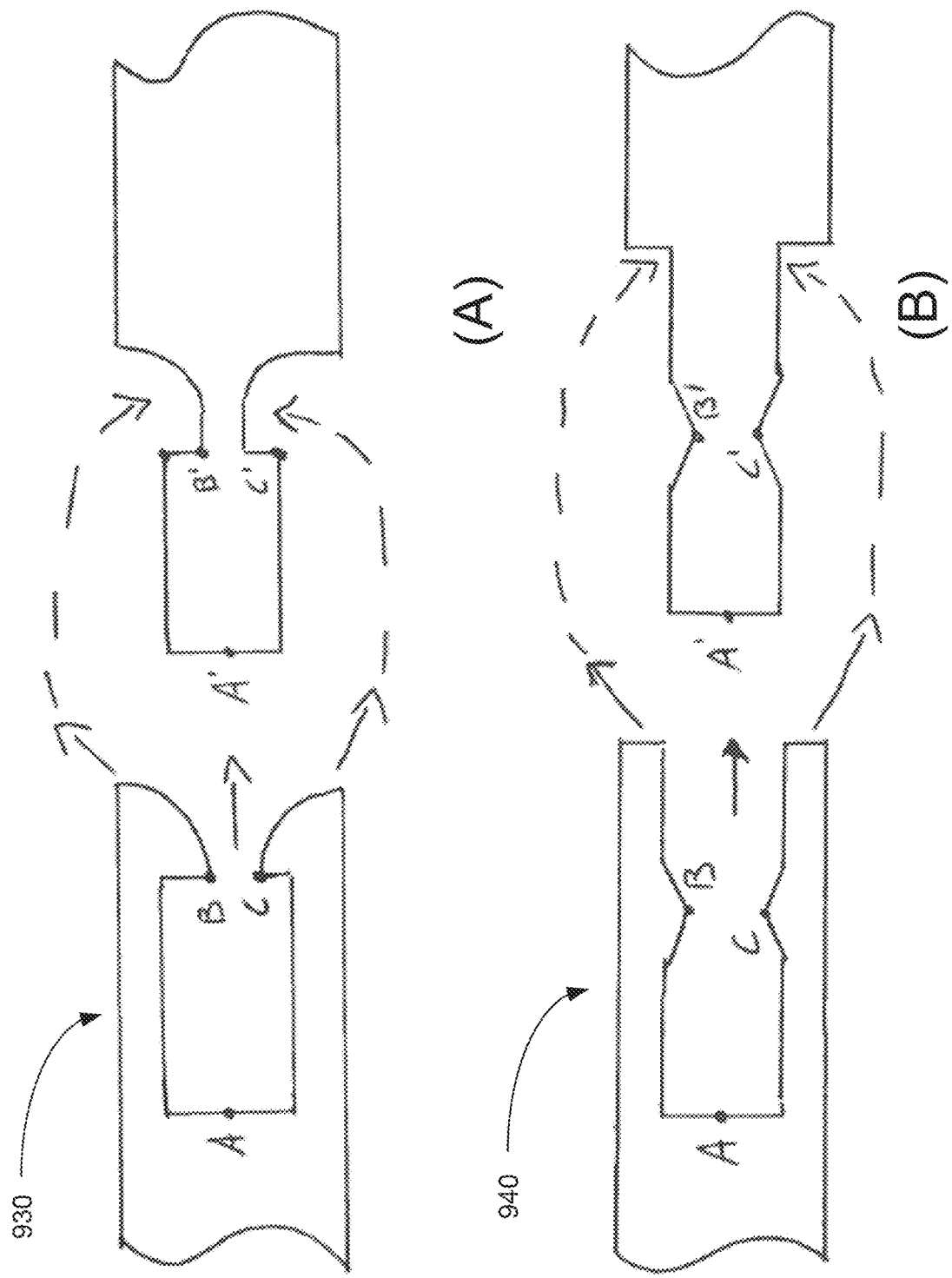
FIG. 25 illustrates (A) a first alternative example, and (B) a second alternative example of interlocking mechanisms for dam walls or pieces.

FIG. 25 illustrates (A) a first alternative example, and (B) a second alternative example of interlocking mechanisms for dam walls or pieces. FIG. 25 illustrates examples of interlocking mechanisms for dam walls or pieces. The first mechanism 903 in view (A) includes two mating or interlocking pieces (made of plastic or the like) that would bend back and snap into place, allowing the construction of a dam longer than the print bed of such pieces. For vertical joining of the printed pieces, a dovetail connection would require vertical clearance and access. Locations A, B, C of the first piece as shown would mate with locations A', B', and C' of the second piece. The second mechanism 904 in view (B) includes two mating or interlocking pieces having a different geometric configuration from the first mechanism for a connection by mating locations A, B, C of the first piece with locations A', B', and C' of the second piece. This interlocking configuration may be used to increase kit reusability or east of fit.

Figure 26:
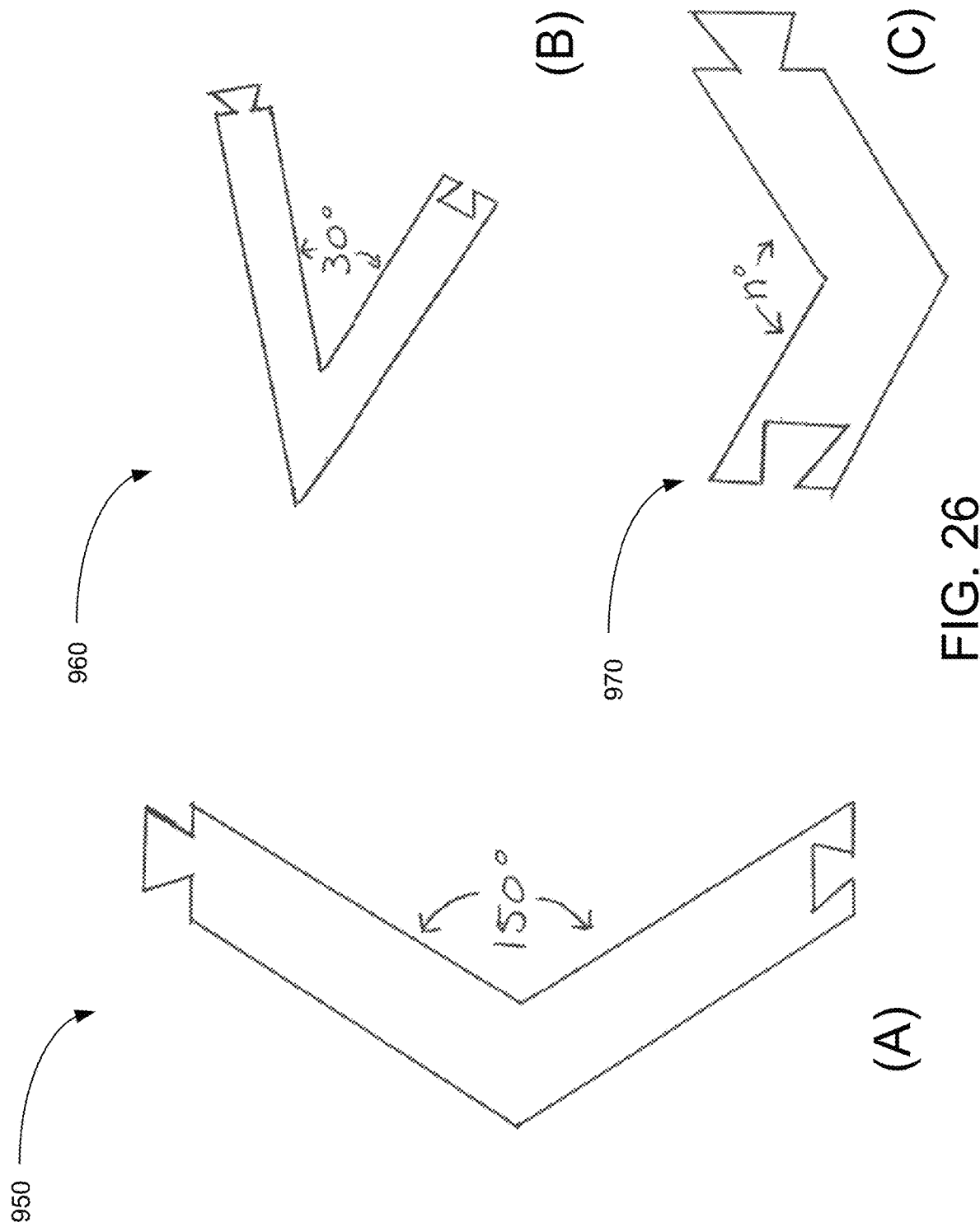
FIG. 26 illustrates (A) a first example, (B) a second example, and (C) a third example of corner dam walls or pieces.

FIG. 26 illustrates (A) a first example, (B) a second example, and (C) a third example of corner dam walls or pieces. The first corner dam wall or piece 950 in view (A) has a relatively wide angle (e.g., about) 150° to accommodate non-rectangular shapes. The dovetails may be perpendicular to straight pieces and/or corner edges (as shown). The second corner dam wall or piece 960 in view (B) has a relatively narrow angle (e.g., about) 30°. The dovetails may be perpendicular to corner edges as shown. The third corner dam or piece 970 in view (C) has a corner angle n which may range from greater than 0° to smaller than 180°.

Figure 27:
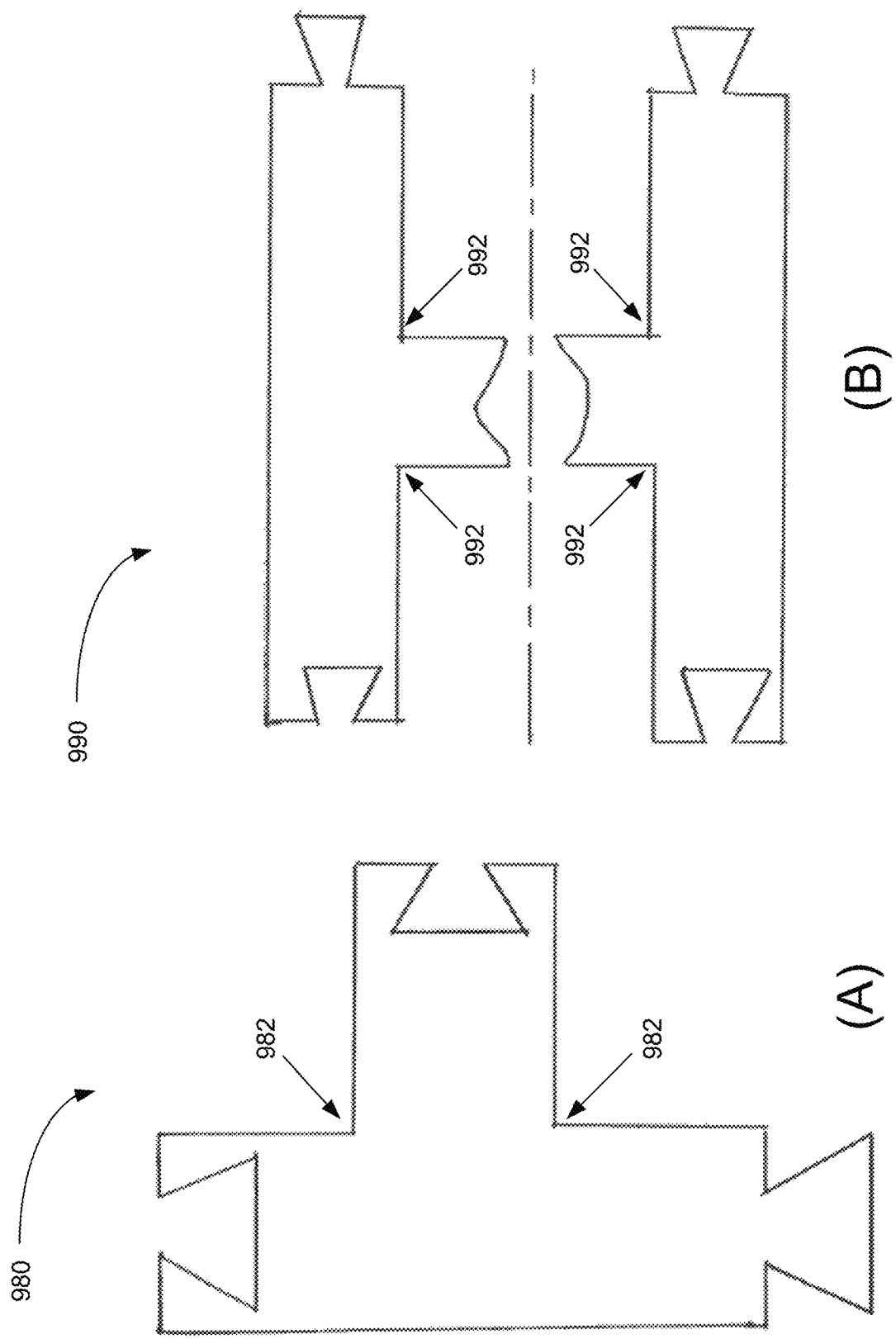
FIG. 27 illustrates (A) a first example and (B) a second example of dam walls or pieces of other configurations.

FIG. 27 illustrates (A) a first example and (B) a second example of dam walls or pieces of other configurations. The T-shaped dam wall or piece 980 in view (A) has two adjacent corners 982 on opposite sides of a wall. The H-shaped dam wall or piece 990 in view (B) has two sets of two adjacent corners 992 on opposite sides of a wall. As components of a chocking compound dam kit, these configurations add capability and flexibility to dam wall constructions.

Figure 28:
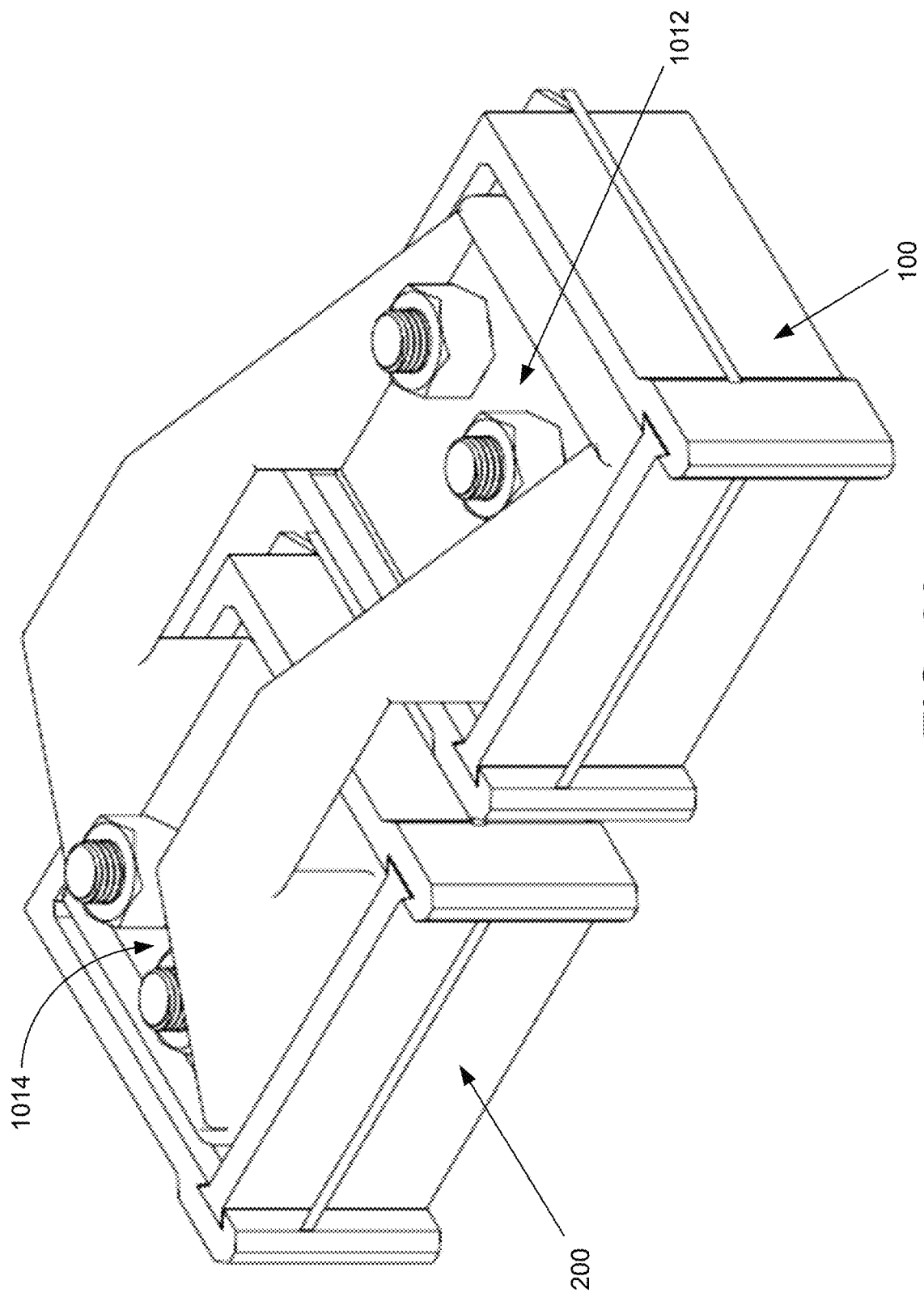
FIG. 28 illustrates an example of using a front-foot chocking compound dam and a rear-foot chocking compound dam for pouring a chocking compound around front and rear feet of a machinery to provide a foundation for the machinery.

FIG. 28 illustrates an example of using a front-foot chocking compound dam 100 and a rear-foot chocking compound dam 200 for pouring a chocking compound around front and rear feet of a machinery to provide a foundation for the machinery. The front-foot chocking compound dam 100 may be custom-made to generally match the shape of the front foot 1012 for pouring the chocking compound around the front foot 1012. The rear-foot chocking compound dam 200 may be custom-made to generally match the shape of the rear foot 1014 for pouring the chocking compound around the rear foot 1014.

The front-foot chocking compound dam 100 and rear-foot chocking compound dam 200 are removed after curing of the chocking compound around the front foot 1012 and rear foot 1014. The working time and cure depends on temperature and mass. The higher the temperature, the faster the cure. This forms a front chock 1022 around the front foot 1012 and a rear chock 1024 around the rear foot 1014.

Figure 29:
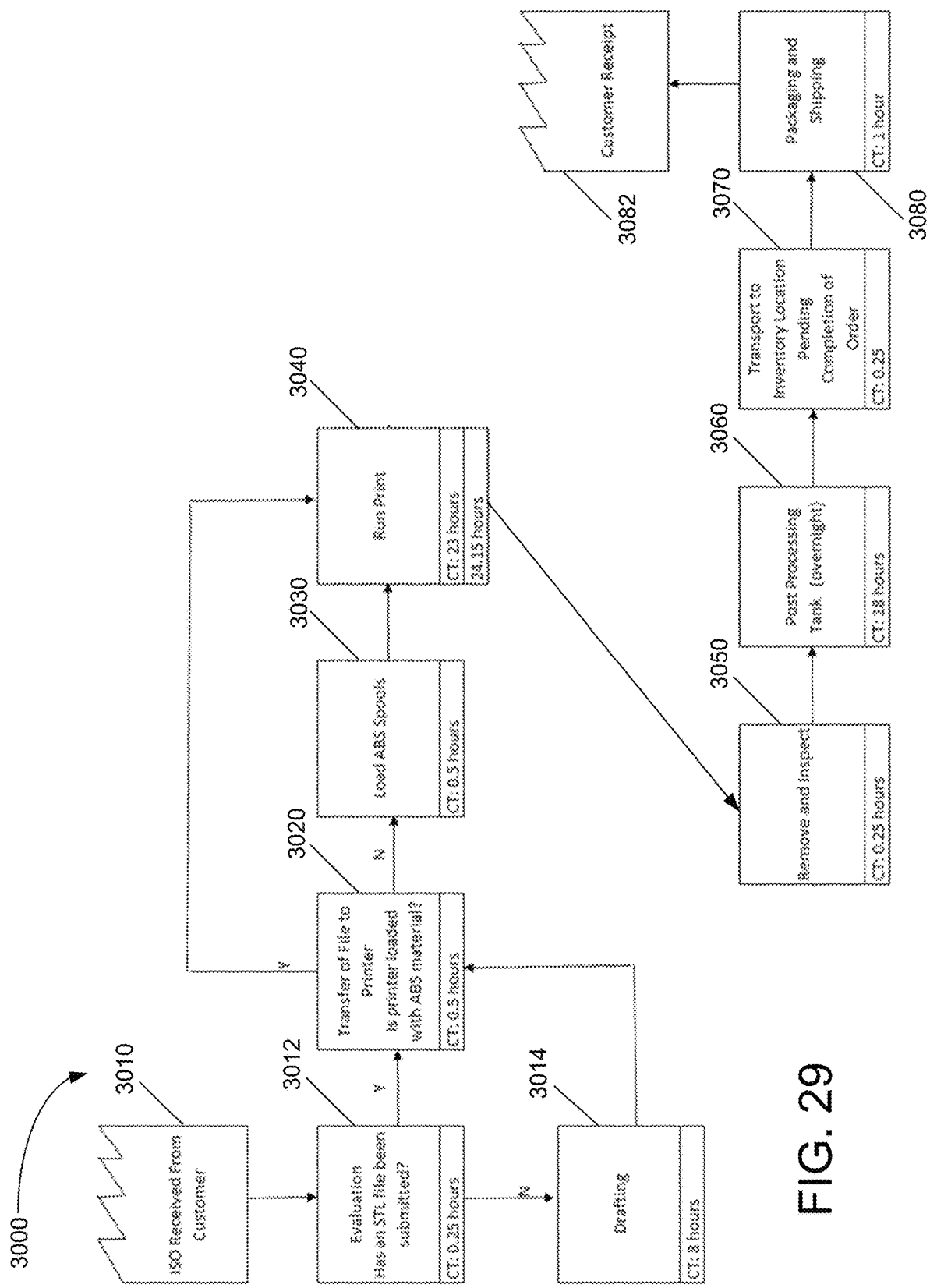
FIG. 29 is a flow diagram illustrating an example of making a chocking compound dam assembly.

FIG. 29 is a flow diagram 3000 illustrating an example of making a chocking compound dam assembly. In this example, the flow diagram shows how a company would map and plan for Chockfast dam kit orders. It starts with an Initial Service Order (ISO) sent to the company (step 3010). The company then evaluates whether there is already an .STL file in the system to match this specific request, which would take about 0.25 manhours, for instance (step 3012). If yes, the next step is 3020; if no, the next step is 3014. If any unique features, functions, angles, or pieces need to be created, then it is estimated that it would take 8 labor hours to draft and prepare an .STL file (which the printers can read) (step 3014). Next, it takes on average about 0.5 manhours to load the file into the printer and verify the settings (step 3020). Then the technician will load the appropriate polymer to be printed (ABS plastic in this example) which takes another 0.5 manhours (step 3030). If the printer is already loaded (e.g., with ABS material), step 3030 is skipped. Once the print file is loaded, the print is started and runs to completion (step 3040). For the example, the printer will run for 112 hours to print the full Chockfast dam kit, but the only manhours required are approximately 3.5 where the technician checks on the machine to periodically verify the print does not have any issues. The printer continues operation and adds value to the process even during non-working hours, which is why the CT (cycle time) and AT (actual time) are different. After the print, it takes another 0.25 manhours to remove the part and inspect it for quality assurance (step 3050). Post processing may follow for a period of time (e.g., overnight) in step 3060. Step 3070 is performed if there is a need to transport the part(s) to the inventory location pending completion of the order. Lastly the kit is transported to and packaged for shipping, which combined would take about 1.25 manhours (step 3080). Customer receipt is produced in step 3082. Overall, the process requires only 5.75 manhours devoted to it, or 13.75 if a new file is required. This anticipated workflow demonstrates the adaptability of the items to be quickly produced with minimal labor and maximize the benefits of additive manufacturing. Additionally, the drafting/modeling time requirement will become less and less frequent as the file library grows with each new request.

The inventive concepts taught by way of the examples discussed above are amenable to modification, rearrangement, and embodiment in several ways. For example, this invention may be applicable in other systems having different geometries, sizes, or arrangements of components. Accordingly, although the present disclosure has been described with reference to specific embodiments and examples, persons skilled in the art will recognize that changes may be made in form and detail without departing from the spirit and scope of the disclosure.

An interpretation under 35 U.S.C. § 112 (f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not to be taken as limiting or restricting the systems, techniques, approaches, methods, or devices to those appearing in any section. Rather, the teachings and disclosures herein can be combined or rearranged with other portions of this disclosure and the knowledge of one of ordinary skill in the art. It is intended that this disclosure encompass and include such variation.

The indication of any elements or steps as "optional" does not indicate that all other or any other elements or steps are mandatory. The claims define the invention and form part of the specification. Limitations from the written description are not to be read into the claims.

What is claimed is:

1. A chocking compound dam comprising:
   a plurality of prefabricated dam walls, each prefabricated dam wall having two side edges each being configured to connect to a side edge of another prefabricated dam wall, the plurality of prefabricated dam walls being connected to form a dam surrounding a chocking compound pour area, each prefabricated dam wall having a height and a length;
   at least one of the prefabricated dam walls including a longitudinal stiffener, the longitudinal stiffener extending along the length of the prefabricated dam wall and having a width protruding transversely from the prefabricated dam wall;
   the longitudinal stiffener protruding transversely from an external surface of the prefabricated dam wall at an angle less than 90° relative to the external surface.

2. The chocking compound dam of claim 1, wherein the longitudinal stiffener protrudes transversely from the external surface of the prefabricated dam wall at the angle of about 30° to about 60° relative to the external surface.

3. The chocking compound dam of claim 1, wherein the plurality of prefabricated dam walls comprise a first prefabricated dam wall forming first, second, and third sides of a rectangular dam and a second prefabricated dam wall forming a fourth side of the rectangular dam.

4. The chocking compound dam of claim 1, wherein the plurality of prefabricated dam walls comprise curved prefabricated dam walls which are connected to form a curved dam.

5. The chocking compound dam of claim 1, wherein at least one of the plurality of prefabricated dam walls includes an upper cutout or a lower cutout.

6. The chocking compound dam of claim 1, wherein at least one of the plurality of prefabricated dam walls has a height different from another one of the plurality of prefabricated dam walls.

7. The chocking compound dam of claim 1, wherein at least one of the plurality of prefabricated dam walls includes a cooling slot adjacent the chocking compound pour area to receive a cooling member.

8. The chocking compound dam of claim 1, wherein two prefabricated dam walls of the plurality of prefabricated dam walls are configured to connect to one another via one of a sliding connection to be connected by sliding the two prefabricated dam walls in a height direction or a clipped connection to be connected by pushing the two prefabricated dam walls in a length direction.

9. The chocking compound dam of claim 1, wherein two prefabricated dam walls of the plurality of prefabricated dam walls are configured to be stacked in a height direction.

10. A method of forming a chock, the method comprising:
    constructing a chocking compound dam by connecting a plurality of prefabricated dam walls to form a dam surrounding a chocking compound pour area, each prefabricated dam wall having two side edges each being configured to connect to a side edge of another prefabricated dam wall, each prefabricated dam wall having a height and a length;
    the chocking compound dam being constructed by connecting at least two prefabricated dam walls to one another via one of a sliding connection to be connected by sliding the two prefabricated dam walls in a height direction or a clipped connection to be connected by pushing the two prefabricated dam walls in a length direction.

11. The method of claim 10, wherein the chocking compound dam is constructed by connecting a first prefabricated dam wall forming first, second, and third sides of a rectangular dam and a second prefabricated dam wall forming a fourth side of the rectangular dam.

12. The method of claim 10, wherein the chocking compound dam is constructed by connecting a plurality of curved prefabricated dam walls to form a curved dam.

13. The method of claim 10, wherein the chocking compound dam is constructed by connecting at least two prefabricated dam walls of the plurality of prefabricated dam walls which are stacked in a height direction.

14. The method of claim 10, wherein one of the prefabricated dam walls includes a pour point for the chocking compound dam, the method further comprising:
pouring a chocking compound into the chocking compound pour area via a pour spout clip which is clipped to the prefabricated dam wall including the pour point at the pour point; and
removing the chocking compound dam after curing of the chocking compound to form the chock.

15. The method of claim 10, further comprising:
creating a design of the plurality of prefabricated dam walls for forming a modular construction of the dam to surround the chocking compound pour area; and
forming the plurality of prefabricated dam walls by additive manufacturing.

16. A chocking compound dam comprising:
a plurality of prefabricated dam walls, each prefabricated dam wall having two side edges each being configured to connect to a side edge of another prefabricated dam wall, the plurality of prefabricated dam walls being connected to form a dam surrounding a chocking compound pour area, each prefabricated dam wall having a height and a length;
two prefabricated dam walls of the plurality of prefabricated dam walls being configured to connect to one another via one of a sliding connection to be connected by sliding the two prefabricated dam walls in a height direction or a clipped connection to be connected by pushing the two prefabricated dam walls in a length direction.

17. The chocking compound dam of claim 16, wherein the plurality of prefabricated dam walls comprise a first prefabricated dam wall forming first, second, and third sides of a rectangular dam and a second prefabricated dam wall forming a fourth side of the rectangular dam.

18. The chocking compound dam of claim 16, wherein the plurality of prefabricated dam walls comprise curved prefabricated dam walls which are connected to form a curved dam.

19. The chocking compound dam of claim 16, wherein at least one of the plurality of prefabricated dam walls includes an upper cutout or a lower cutout.

20. The chocking compound dam of claim 16, wherein at least one of the plurality of prefabricated dam walls has a height different from another one of the plurality of prefabricated dam walls.

21. The chocking compound dam of claim 16, wherein at least one of the plurality of prefabricated dam walls includes a cooling slot adjacent the chocking compound pour area to receive a cooling member.

22. A method of forming a chock, the method comprising:
constructing a chocking compound dam by connecting a plurality of prefabricated dam walls to form a dam surrounding a chocking compound pour area, each prefabricated dam wall having two side edges each being configured to connect to a side edge of another prefabricated dam wall, each prefabricated dam wall having a height and a length, one of the prefabricated dam walls including a pour point for the chocking compound dam;
pouring a chocking compound into the chocking compound pour area via a pour spout clip which is clipped to the prefabricated dam wall including the pour point at the pour point; and
removing the chocking compound dam after curing of the chocking compound to form the chock.

23. The method of claim 22, wherein the chocking compound dam is constructed by connecting a first prefabricated dam wall forming first, second, and third sides of a rectangular dam and a second prefabricated dam wall forming a fourth side of the rectangular dam.

24. The method of claim 22, wherein the chocking compound dam is constructed by connecting a plurality of curved prefabricated dam walls to form a curved dam.

25. The method of claim 22, wherein the chocking compound dam is constructed by connecting at least two prefabricated dam walls of the plurality of prefabricated dam walls which are stacked in a height direction.

26. A method of forming a chock, the method comprising:
constructing a chocking compound dam by connecting a plurality of prefabricated dam walls to form a dam surrounding a chocking compound pour area, each prefabricated dam wall having two side edges each being configured to connect to a side edge of another prefabricated dam wall, each prefabricated dam wall having a height and a length, one of the prefabricated dam walls including a pour point for the chocking compound dam;
creating a design of the plurality of prefabricated dam walls for forming a modular construction of the dam to surround the chocking compound pour area;
forming the plurality of prefabricated dam walls by additive manufacturing;
electronically modifying the design of the plurality of prefabricated dam walls to adapt to a change in the chocking compound pour area; and
forming the plurality of prefabricated dam walls having the modified design by additive manufacturing.

27. The method of claim 26, wherein the chocking compound dam is constructed by connecting a first prefabricated dam wall forming first, second, and third sides of a rectangular dam and a second prefabricated dam wall forming a fourth side of the rectangular dam.

28. The method of claim 26, wherein the chocking compound dam is constructed by connecting a plurality of curved prefabricated dam walls to form a curved dam.

29. The method of claim 26, wherein the chocking compound dam is constructed by connecting at least two prefabricated dam walls of the plurality of prefabricated dam walls which are stacked in a height direction.

* * * * *